United States Patent
Mori et al.

(10) Patent No.: US 9,419,301 B2
(45) Date of Patent: Aug. 16, 2016

(54) ELECTROLYTE MEMBRANE FOR SOLID POLYMER FUEL CELLS, MEMBRANE ELECTRODE ASSEMBLY HAVING SAID ELECTROLYTE MEMBRANE, AND SOLID POLYMER FUEL CELL

(75) Inventors: Masahiro Mori, Osaka (JP); Shinya Kikuzumi, Osaka (JP); Tsutomu Kawashima, Nara (JP); Yasuhiro Ueyama, Hyogo (JP); Kazunori Kubota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 460 days.

(21) Appl. No.: 13/994,907

(22) PCT Filed: Nov. 14, 2011

(86) PCT No.: PCT/JP2011/006341
§ 371 (c)(1),
(2), (4) Date: Jun. 17, 2013

(87) PCT Pub. No.: WO2012/093432
PCT Pub. Date: Jul. 12, 2012

(65) Prior Publication Data
US 2013/0273455 A1 Oct. 17, 2013

(30) Foreign Application Priority Data
Jan. 7, 2011 (JP) .................. 2011-002094

(51) Int. Cl.
*H01M 2/10* (2006.01)
*H01M 8/10* (2016.01)
*H01B 1/12* (2006.01)

(52) U.S. Cl.
CPC ............. *H01M 8/1039* (2013.01); *H01B 1/122* (2013.01); *H01M 8/106* (2013.01); *H01M 8/1062* (2013.01); *Y02E 60/521* (2013.01)

(58) Field of Classification Search
CPC .. H01B 1/122; H01M 8/1039; H01M 8/1062; H01M 8/106
See application file for complete search history.

(56) References Cited

U.S. PATENT DOCUMENTS 4,482,593 A * 11/1984 Sagel .................... D04H 11/00
428/90
7,943,249 B2   5/2011 Kawazoe et al.
(Continued)

FOREIGN PATENT DOCUMENTS

JP   08-185872    7/1996
JP   2000-215903  8/2000
(Continued)

OTHER PUBLICATIONS

International Search Report mailed Feb. 14, 2012 in International (PCT) Application No. PCT/JP2011/006341.
(Continued)

*Primary Examiner* — Cynthia H Kelly
*Assistant Examiner* — Monique Wills
(74) *Attorney, Agent, or Firm* — Wenderoth, Lind & Ponack, L.L.P.

(57) ABSTRACT

An electrolyte membrane for solid polymer fuel cell includes a reinforce membrane made of nonwoven fibers and an electrolyte provided in a space among the nonwoven fibers. The nonwoven fibers have a non-uniform mass distribution in a plane of the electrolyte membrane. A mass of the nonwoven fibers per unit area in a region corresponding to at least part of a peripheral portion of a fuel cell-use gasket frame is greater than a mass of the nonwoven fibers per unit area in a region corresponding to a center portion of the gasket frame. The electrolyte membrane for solid polymer fuel cell is attached to the fuel cell-use gasket frame.

18 Claims, 22 Drawing Sheets

(56) References Cited

U.S. PATENT DOCUMENTS

| | | |
|---|---|---|
| 8,221,919 B2 | 7/2012 | Shimoda et al. |
| 2004/0016638 A1* | 1/2004 | LaConti .................. C25B 9/04 204/252 |
| 2006/0019140 A1 | 1/2006 | Kawazoe et al. |
| 2007/0104994 A1 | 5/2007 | Endoh et al. |
| 2007/0111076 A1 | 5/2007 | Endoh |
| 2009/0208806 A1* | 8/2009 | Izuhara ............. C08G 65/4056 429/450 |
| 2009/0246592 A1 | 10/2009 | Kinoshita |
| 2010/0043954 A1 | 2/2010 | Shimoda et al. |
| 2010/0304205 A1* | 12/2010 | Jo ............................ H01G 9/02 429/144 |
| 2011/0070521 A1 | 3/2011 | Ishikawa et al. |
| 2011/0212383 A1 | 9/2011 | Kawazoe et al. |
| 2011/0262832 A1 | 10/2011 | Endoh et al. |
| 2011/0281196 A1 | 11/2011 | Terada et al. |

FOREIGN PATENT DOCUMENTS

| | | |
|---|---|---|
| JP | 2000-260443 | 9/2000 |
| JP | 2003-068318 | 3/2003 |
| JP | 2006-338880 | 12/2006 |
| JP | 2007-031718 | 2/2007 |
| JP | 2008-210664 | 9/2008 |
| JP | 2008-269806 | 11/2008 |
| JP | 2009-064777 | 3/2009 |
| JP | 2009-245639 | 10/2009 |
| JP | 2009-301755 | 12/2009 |
| WO | 2009/116630 | 9/2009 |
| WO | 2010/098400 | 9/2010 |

OTHER PUBLICATIONS

Extended European Search Report issued Nov. 19, 2013 in corresponding European Patent Application No. 11854577.1.

International Preliminary Report on Patentability and Written Opinion of the International Searching Authority mailed Jul. 18, 2013 in International (PCT) Application No. PCT/JP2011/006341.

* cited by examiner

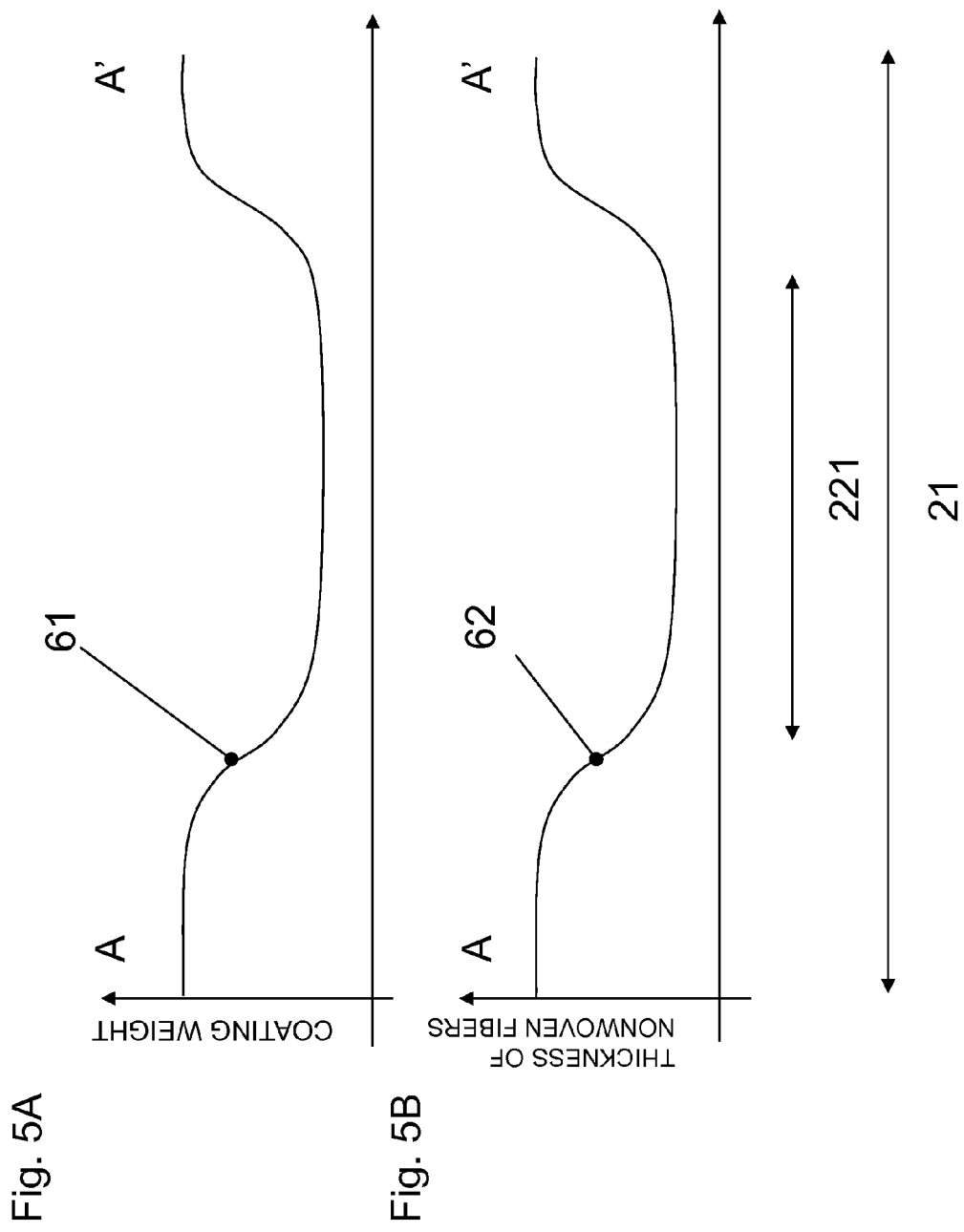

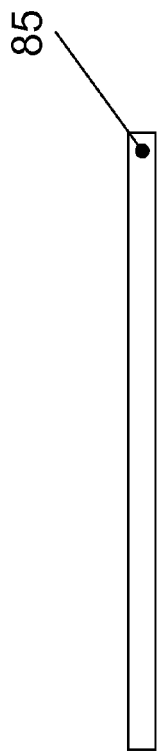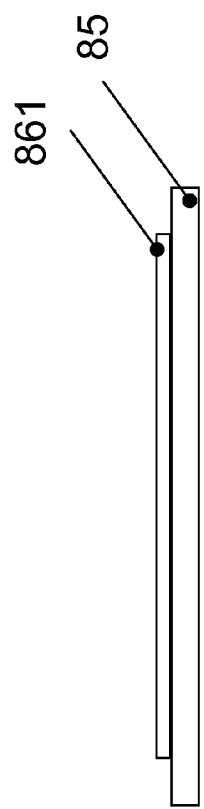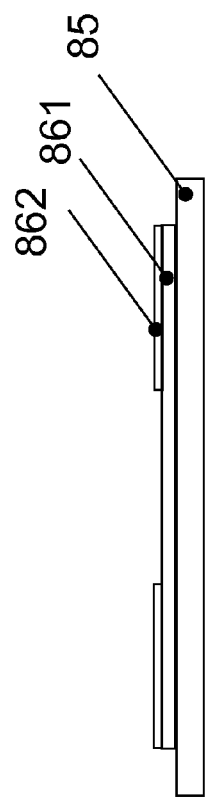

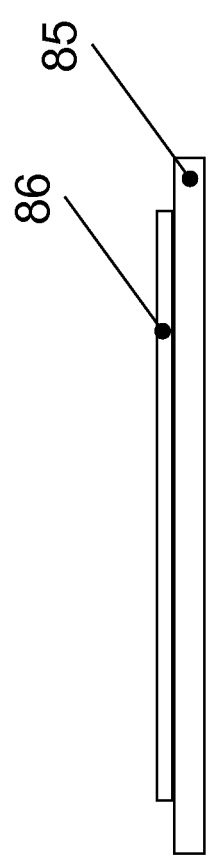
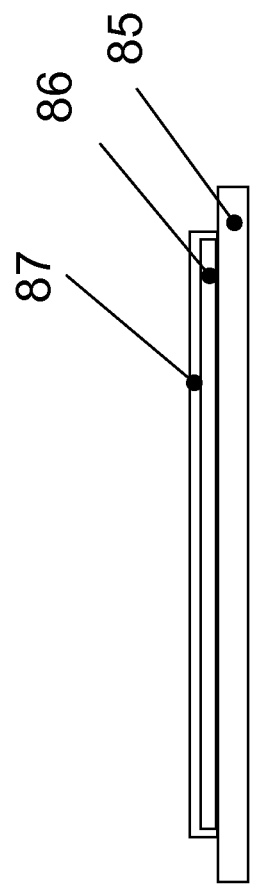
Fig. 11A
Fig. 11B

ELECTROLYTE MEMBRANE FOR SOLID POLYMER FUEL CELLS, MEMBRANE ELECTRODE ASSEMBLY HAVING SAID ELECTROLYTE MEMBRANE, AND SOLID POLYMER FUEL CELL

TECHNICAL FIELD

The present invention relates to an electrolyte membrane for solid polymer fuel cell reinforced with nonwoven fibers, a membrane electrode assembly having the electrolyte membrane for solid polymer fuel cell, and a solid polymer fuel cell.

DESCRIPTION OF THE RELATED ART

In general, a fuel cell is structured as follows: joining a catalyst layer to an electrolyte membrane that causes a power generation reaction; clamping the joined catalyst layer and the electrolyte membrane between separators to obtain one module; and stacking the module by the required number of pieces. In order to provide sealability against the fuel gas, the electrolyte membrane is fixed to an injection mold product functioning as a fixing seal (gasket) preventing leakage of the fuel gas, the injection mold product being mainly a resin-made frame-like frame element. Further, the electrolyte membrane fixed to the frame element is clamped between the separators, to form a module.

In recent years, as the electrolyte membrane for solid polymer fuel cell, a proton conductive ion exchange membrane is used. In particular, use of a cation exchange membrane made of perfluorocarbon polymer having a sulfonate group (hereinafter referred to as the "sulfonate group-type perfluorocarbon polymer") is widely taken into consideration for its excellent basic characteristic. What is required as a practical electrolyte membrane for fuel cell is a membrane with low ohmic loss. The membrane ohmic loss depends on the electrical conductivity of the electrolyte polymer.

As the method for reducing the electrical resistance of the cation exchange membrane, there is a method for increasing the sulfonate group concentration.

However, a significant increase in the sulfonate group concentration invites problems such as a reduction in the mechanical strength of the membrane or a reduction in the durability of the fuel cell, which is attributed to the membrane creeping through a long period of operation of the fuel cell. Further, the electrolyte membrane with a high sulfonate group concentration itself greatly expands when impregnated with water, and tends to invite various disadvantages. The size of the membrane increases by the water generated upon a power generation reaction or by the water vapor supplied with the fuel gas. Then, the increase in the size of the membrane becomes "wrinkles". The wrinkles bury the groove of the separators, to hinder the gas flow. Further, repetitive stop of the operation causes the membrane to repetitively expand and contract. This results in generation of crack in the membrane or the electrode joined to the membrane, to invite a reduction in the cell performance.

As the method for solving such problems, it is proposed to put a reinforce member into the electrolyte membrane (for example, see Patent Documents 1 to 4). The conventional membrane electrode assembly employs a solid polymer electrolyte membrane including therein a porous sheet as the reinforce member. Another proposal is an electrolyte membrane including therein nonwoven fibers of polyvinylidene fluoride copolymer as the reinforce member in place of the porous sheet (for example, see Patent Document 2).

PRIOR ART DOCUMENTS

Patent Documents

Patent Document 1: Japanese Patent Laid-open Publication No. 2009-301755
Patent Document 2: Japanese Patent Laid-open Publication No. 2009-245639
Patent Document 3: Japanese Patent Laid-open Publication No. 2008-269806
Patent Document 4: Japanese Patent Laid-open Publication No. 2009-64777

SUMMARY OF THE INVENTION

When an electrolyte membrane is attached to gaskets with the structure disclosed in Patent Document 1, in the region not being fixed to the gaskets, a power generation reaction takes place, and water is generated. Though the nonwoven fabric suppresses as the reinforce member the expansion of the membrane, a certain degree of change in the size of the membrane occurs. On the other hand, in the region being fixed to the gaskets, no reaction takes place, and hence no water is generated. Thus, the region is constantly dry. Accordingly, the membrane deteriorates because of an occurrence of creep at the abutting surface between the electrolyte membrane and the gaskets. Further, there is another problem that, at the periphery of the gaskets being the interface between the expansion region and the dry region also, a crack occurs at the electrolyte membrane or the electrode joined to the membrane, to incur a reduction in cell performance.

Further, near the inflow port of the fuel gas, the gas concentration is high. Accordingly, the power generation reaction actively occurs. That is, water is generated also by a great amount near the fuel gas inflow port, and the variation amount of the electrolyte membrane between expansion and dry contraction becomes great. This causes occurrence of a crack at the electrolyte membrane. Therefore, there is a problem that a reduction in the cell performance is invited.

As a method for solving such problems, for example, what can be considered is a method for increasing the thickness of a porous sheet disposed as the reinforce member in an electrolyte membrane, or a method for suppressing the variation in the size of the electrolyte membrane attributed to the expansion and contraction of the electrolyte membrane by increasing the strength of the porous sheet by reducing the holes formed in the porous sheet. However, such a method involves the technical contradiction. That is, such a method invites a reduction in proton conductivity of the electrolyte membrane, which influences the power generating characteristic of the fuel cell.

An object of the present invention is to provide an electrolyte membrane for solid polymer fuel cell with suppressed deterioration of the membrane attributed to variations of the size of the membrane which occurs when the electrolyte membrane is impregnated with water, without reducing the proton conductivity, and with stable fuel cell performance that endures for a long period.

According to the present invention, an electrolyte membrane for solid polymer fuel cell includes:
a reinforce membrane made of nonwoven fibers; and
an electrolyte provided in a space among the nonwoven fibers, wherein the nonwoven fibers have a non-uniform mass distribution in a plane of the electrolyte membrane, and the nonwoven fibers have a mass per unit area in a region corresponding to at least part of a peripheral portion of a fuel cell-use gasket frame which is greater than a mass per unit area in a region corresponding to a center portion of the gasket frame, when the electrolyte membrane for solid polymer fuel cell is attached to the fuel cell-use gasket frame.

Thus, it becomes possible to locally reinforce the region where the electrolyte membrane is prone to deteriorate, to suppress membrane variations of size caused by impregnation of water in operation of the fuel cell, and to secure high durability.

The nonwoven fibers may have a mass per unit area in an outer circumferential portion of the gasket frame which is greater than the mass of the nonwoven fibers per unit area in the region corresponding to the center portion of the gasket frame.

The nonwoven fibers may have a mass per unit area in the outer circumferential portion having a width corresponding to 10% of a length from a side of the gasket frame to an opposing side of the gasket frame which is greater than the mass per unit area in the region corresponding to the center portion of the gasket frame.

Further, the nonwoven fibers may have a mass per unit area in a peripheral portion of a fuel gas inlet which is greater than the mass per unit area in the region corresponding to the center portion of the gasket frame.

Thus, it becomes possible to improve durability of the periphery of the fuel gas inlet where deterioration of the membrane is significant when power is generated using fuel gas being humidified to have a humidity of 100%.

Still further, the nonwoven fibers may have a mass per unit area in a region having a width corresponding to 30% of a length from a side of the gasket frame provided with the fuel gas inlet to an opposing side of the gasket frame which is greater than the mass per unit area in the region corresponding to the center portion of the gasket frame.

In particular, it becomes possible to improve durability of the electrolyte membrane at the periphery of the fuel gas inlet where deterioration of the membrane is significant when power is generated using fuel gas being humidified to have a humidity of 100%.

Still further, the nonwoven fibers may have a mass per unit area in a peripheral portion of a fuel gas outlet which is greater than the mass per unit area in the region corresponding to the center portion of the gasket frame.

Thus, it becomes possible to improve durability of the electrolyte membrane at the periphery of the fuel gas outlet where deterioration of the membrane is significant when power is generated using fuel gas in the low-humidified state.

Still further, the nonwoven fibers may have a mass per unit area in a region having a width corresponding to 30% of a length from a side of the gasket frame provided with the fuel gas outlet to an opposing side of the gasket frame which is greater than the mass per unit area in the region corresponding to the center portion of the gasket frame.

Still further, the nonwoven fibers may have a mass per unit area in the region corresponding to at least part of the peripheral portion of the gasket frame which is greater than and 15 times or less of the mass per unit area in the region corresponding to the center portion of the gasket frame.

Thus, sufficient proton conductivity can be secured and high membrane durability can be obtained, by setting the mass difference of the nonwoven fibers per unit area to be greater by 15 times or less.

Still further, the nonwoven fibers may have a thickness in the region corresponding to at least part of the peripheral portion of the gasket frame which is greater than and 15 times or less of a thickness in the region corresponding to the center portion of the gasket frame.

Thus, sufficient proton conductivity and durability of the membrane can be secured.

Still further, the nonwoven fibers may have a fiber diameter in the region corresponding to at least part of the peripheral portion of the gasket frame which is greater than and 15 times or less of a fiber diameter in the region corresponding to the center portion of the gasket frame.

Thus, sufficient proton conductivity and durability of the membrane can be secured.

Still further, the nonwoven fibers may have a voidage in the region corresponding to at least part of the peripheral portion of the gasket frame which is lower than and $1/15$ times or more of a voidage in the region corresponding to the center portion of the gasket frame.

Thus, sufficient proton conductivity and durability of the membrane can be secured.

Still further, the nonwoven fibers may have a mass per unit area of 0.1 mg/cm$^2$ or more in the region corresponding to the center portion of the gasket frame.

Still further, the nonwoven fibers may contain polyvinylidene fluoride copolymer.

Still further, the nonwoven fibers may be prepared through electrospinning.

Use of electrospinning makes it possible to prepare nonwoven fibers of high voidage. Thus, in the form of an electrolyte membrane, high proton conductivity can be secured. Further, the mass of the nonwoven fibers per unit area or the region where the mass per unit area should be changed can be easily controlled. As a result, it becomes possible to suppress variations in size of the membrane due to impregnation of water in operation of the fuel cell, to secure high durability.

Still further, the electrolyte may be a proton conductive ion exchange membrane.

An membrane electrode for solid polymer fuel cell assembly of the present invention includes the electrolyte membrane for solid polymer fuel cell and a module having the electrolyte membrane for solid polymer fuel cell fixed to a gasket and clamped between separators.

A solid polymer fuel cell of the present invention includes at least one cell, the cell being structured with the membrane electrode assembly for solid polymer fuel cell and a pair of anode separator and cathode separator clamping the membrane electrode for solid polymer fuel cell assembly.

With the electrolyte membrane for solid polymer fuel cell of the present invention, without inviting a reduction in proton conductivity, deterioration of the membrane attributed to the membrane variations of size when the electrolyte membrane is impregnated with water can be suppressed. Further, durability of the electrolyte membrane can be improved, and an excellent performance of the fuel cell can be secured for a long period.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 5A is a schematic diagram showing the coating weight distribution (mass distribution) of the nonwoven fibers per unit area in the cross section shown in FIG. 2;

FIG. 5B is a schematic diagram of thickness distribution;

FIGS. 6A to 6C are process schematic diagrams of preparing PVDF nonwoven fibers according to the first embodiment;

FIGS. 11A and 11B are schematic diagrams of an electrolyte material applying process for the electrolyte membrane according to the first embodiment;

DETAILED DESCRIPTION OF THE EMBODIMENTS

Figure 1:
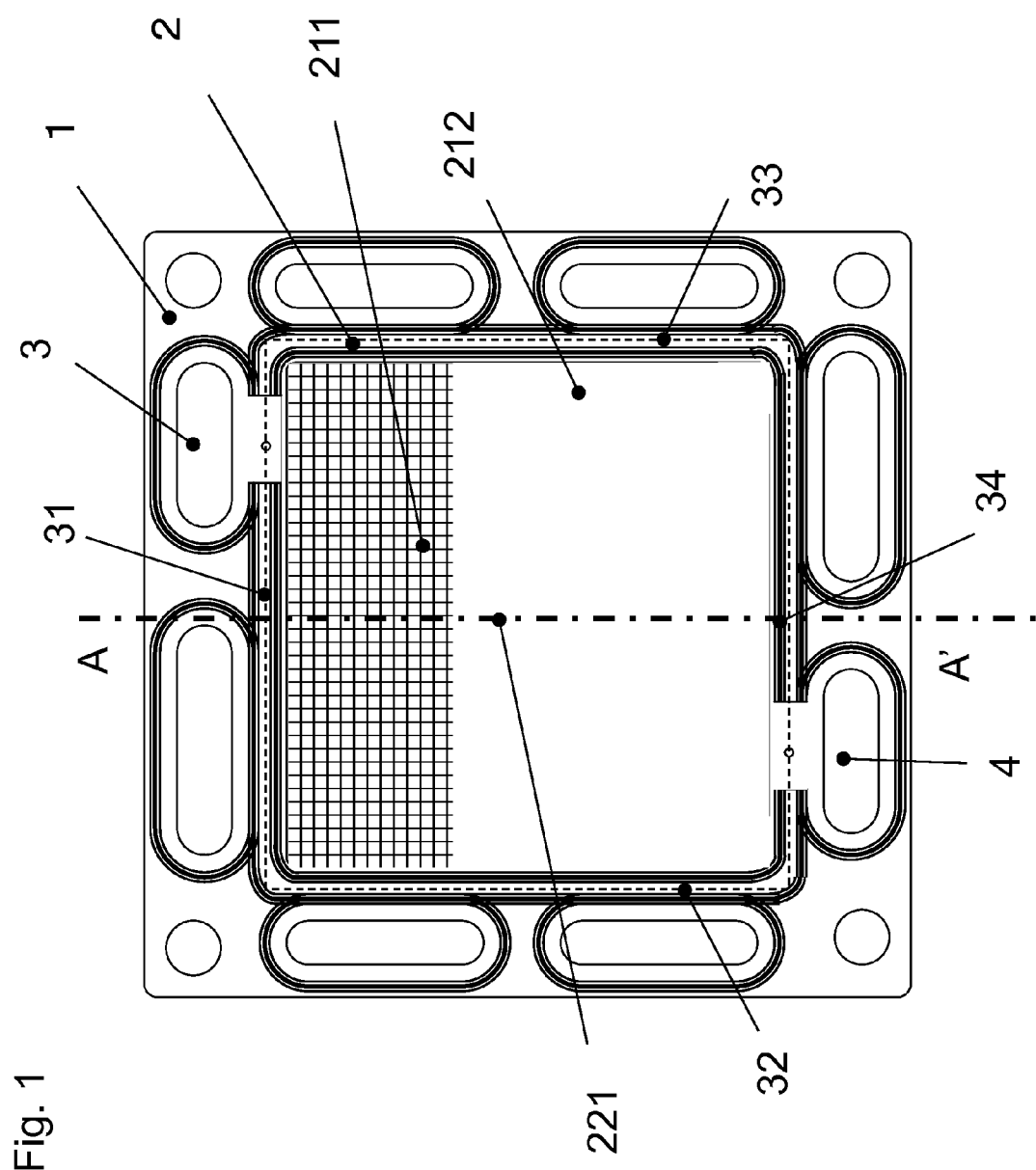
FIG. 1 is a schematic diagram of a membrane integrated frame element using an electrolyte membrane according to a first embodiment.

In the following, a description will be given of an electrolyte membrane for solid polymer fuel cell according to embodiments of the present invention with reference to the drawings. Note that, substantially identical members are denoted by identical reference characters throughout the drawings.

(First Embodiment)

Figure 2:
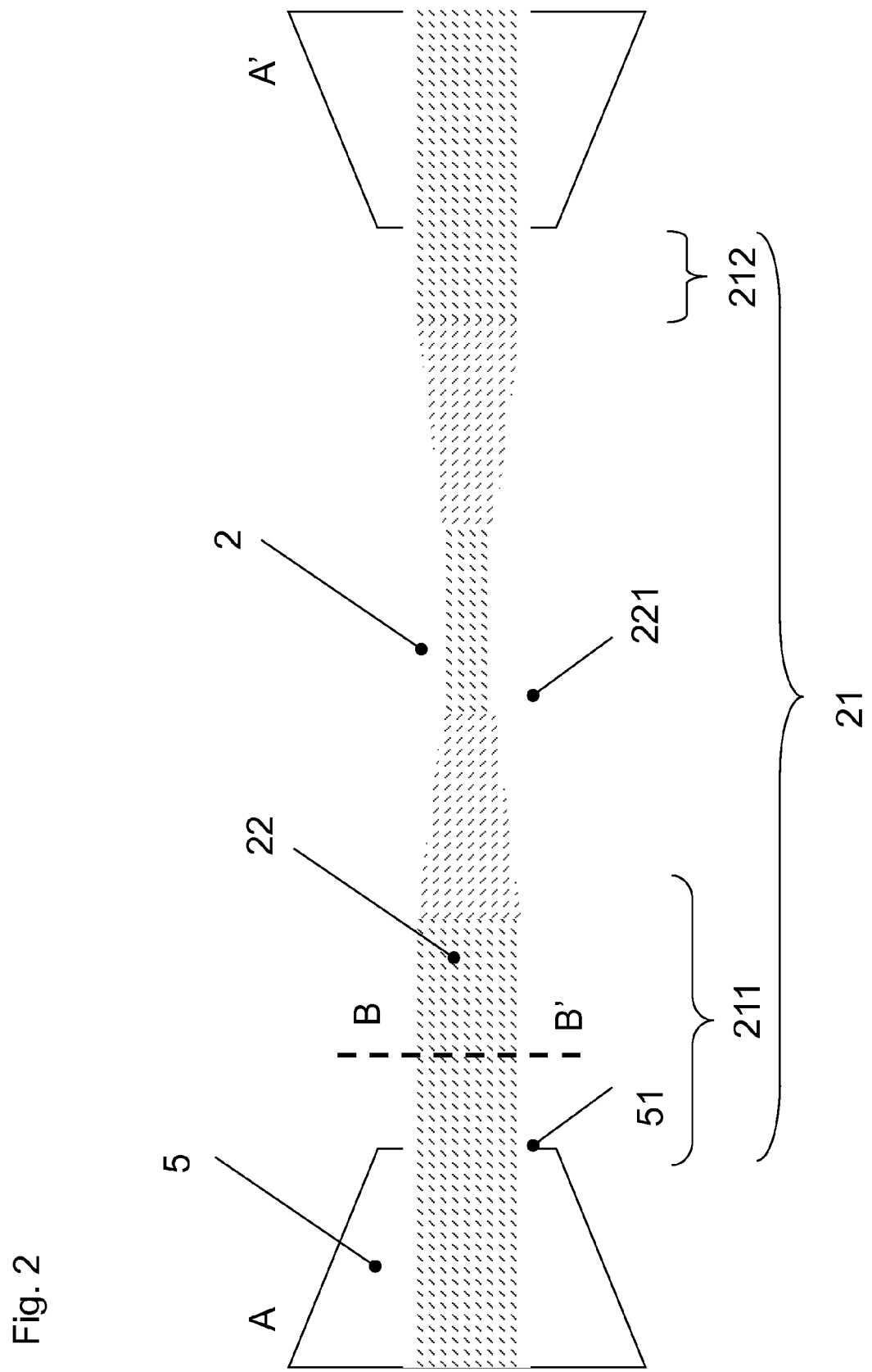
FIG. 2 is a schematic diagram of cross section A-A' of the membrane electrode assembly shown in FIG. 1.

FIG. 1 is a schematic diagram of a membrane integrated frame element 1 using an electrolyte membrane for solid polymer fuel cell (hereinafter referred to as the electrolyte membrane) 2 according to a first embodiment of the present invention. FIG. 2 is a schematic diagram of cross section A-A' of the electrolyte membrane 2 according to the first embodiment shown in FIG. 1. The electrolyte membrane 2 is made of nonwoven fibers of polyvinylidene fluoride copolymer (hereinafter referred to as PVDF) and ion exchange resin packed in voids of the nonwoven fibers. The nonwoven fibers function as a reinforce member. In the present specification, the nonwoven fibers may be referred to also as a reinforce membrane 22 structuring the electrolyte membrane 2. Further, the ion exchange resin is referred to also as a proton conductivity ion exchange membrane. The electrolyte membrane 2 according to the first embodiment is particularly characterized in that the nonwoven fibers have non-uniform mass distribution in the plane of the electrolyte membrane. Further, the electrolyte membrane 2 according to the first embodiment is characterized in that the electrolyte membrane 2 includes therein a reinforce membrane 22 having a mass of the nonwoven fibers per unit area which is greater than the mass of the nonwoven fibers per unit area in a region 221 corresponding to the center portion of the gasket frame in a fuel gas inlet periphery region 211 and a region of a gasket frame peripheral portion 212 along sides 32 to 34 of the gasket frame with no fuel gas inlet 3.

In connection with the electrolyte membrane 2 according to the first embodiment, particularly, since the mass of the nonwoven fibers per unit area in the electrolyte membrane 2 in the region 211 near the fuel gas inlet and the peripheral portion 212 thereof is greater than the mass of the nonwoven fibers per unit area in the region 221 corresponding to the center portion of the gasket frame, it is suitable for the case where the fuel cell is operated using fuel gas being humidified to have a humidity of 100%.

(Reference Example)

Figure 17:
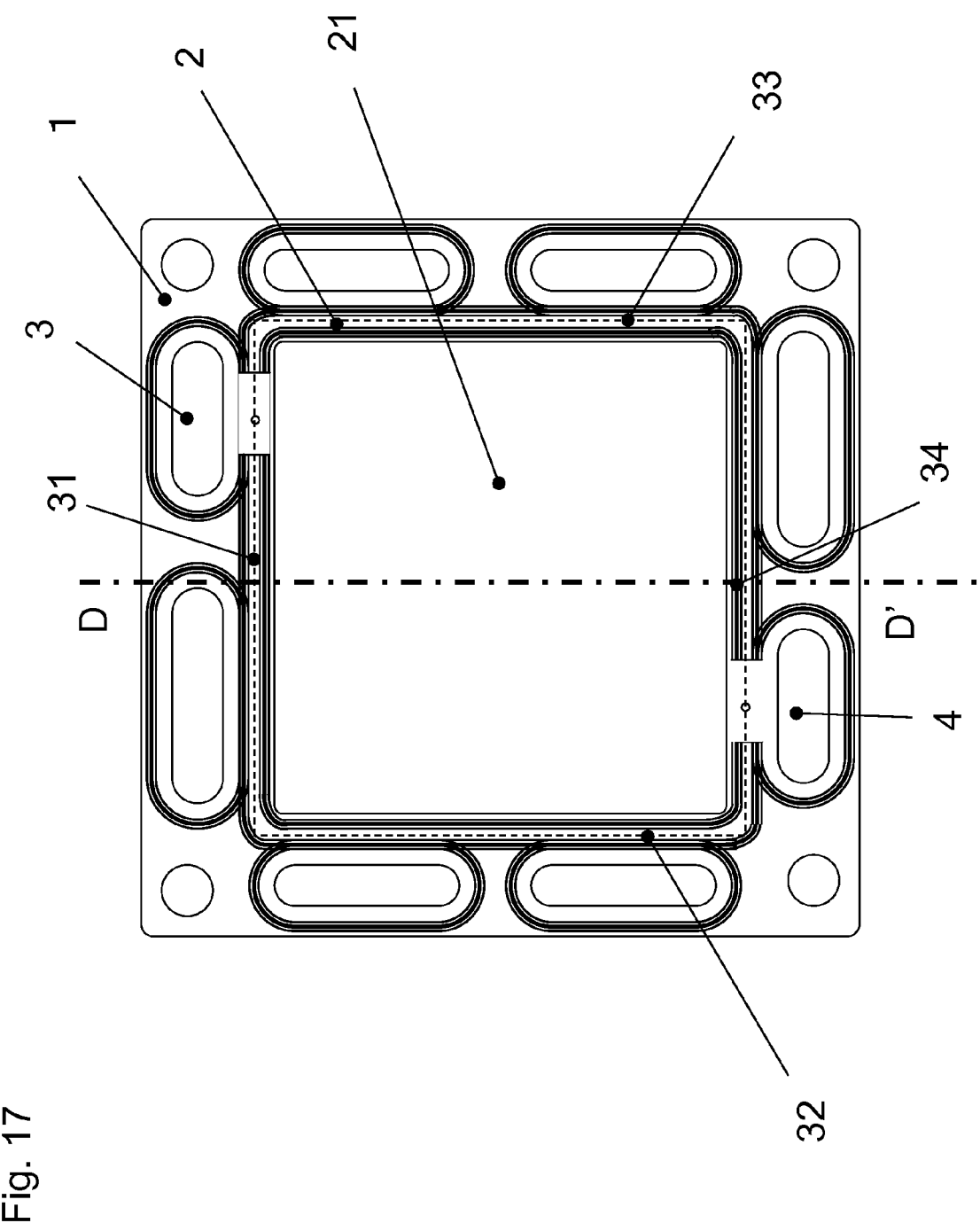
FIG. 17 is a schematic diagram of a membrane electrode assembly of a reference example.
Figure 18:
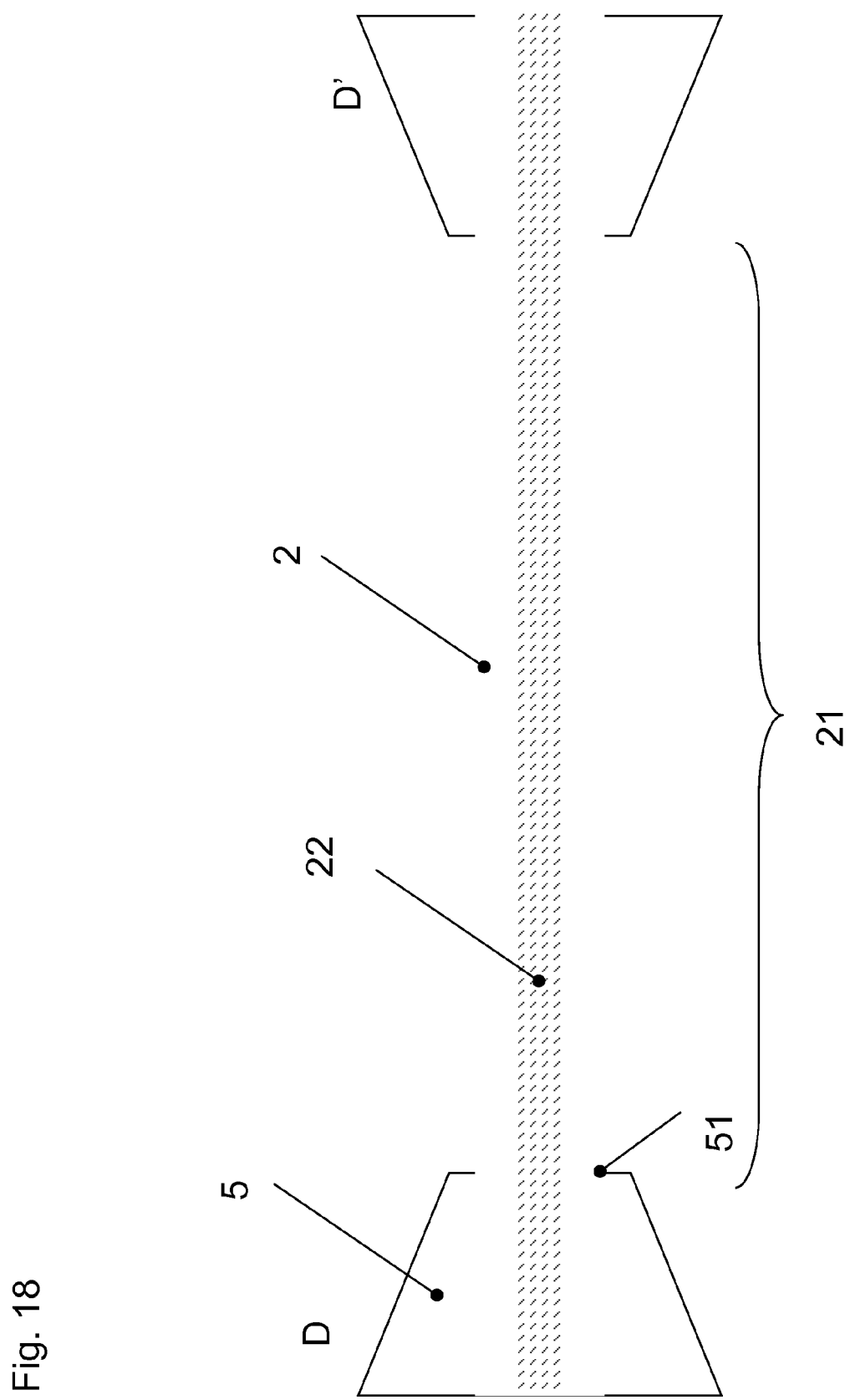
FIG. 18 is a schematic diagram of cross section D-D' of the membrane electrode assembly of the reference example.

FIG. 17 is a schematic diagram showing a membrane integrated frame element 1 using an electrolyte membrane 2 having a reinforce membrane in which the mass of nonwoven fibers per unit area is uniform, as a reference example. FIG. 18 is a schematic diagram showing the cross section of the membrane integrated frame element 1 using the electrolyte membrane 2 including a reinforce membrane 22 in which the mass of nonwoven fibers per unit area is uniform, as a reference example. In the case where the membrane integrated frame element 1 is operated using the fuel gas humidified to have a humidity of 100%, when the fuel gas reaches the power generating region 21, the electrolyte membrane 2 is moisturized by water vapor delivered together with the gas near the fuel gas inlet 3, and hence a power generation reaction occurs actively. In the case where the fuel cell is operated using the fuel gas humidified to have a humidity of 100%, the water vapor delivered together with the fuel gas moisturizes the electrolyte membrane 2 and the water generated by power generation moisturizes the electrolyte membrane 2. As a result, deterioration of the electrolyte membrane is accelerated particularly near the fuel gas inlet 3 in the power generating region 21, because the expansion of the electrolyte membrane 2 performs and variations of size attributed to contraction is caused by dryness in the situation where the fuel cell stops operation.

The electrolyte membrane 2 is retained by gaskets 5, and the electrolyte membrane 2 and the gaskets 5 are clamped by separators (not shown). Power is generated at a power generating region 21 not being fixed to the gaskets 5 of the electrolyte membrane 2. Water is generated by the power generation, and the power generating region 21 in the electrolyte membrane 2 repeats expansion due to water impregnation and contraction due to dryness when operation is stopped. Therefore, deterioration of the membrane is invited at a fixed boundary portion 51 between the sides 32 to 34 of the gasket frame and the electrolyte membrane 2.

Further, with the electrolyte membrane 2 using nonwoven fibers with uniform mass per unit area according to the reference example as the reinforce membrane, deterioration of the electrolyte membrane 2 is significant reaching the fuel gas flow channel pattern portion having been folded three times in a serpentine-like flow channel that is folded three times and that extends from the fuel gas inlet 3 to the separator (not shown).

On the other hand, the electrolyte membrane 2 according to the first embodiment has the reinforce membrane 22 including PVDF nonwoven fibers, which function as a whole as the reinforce member, with non-uniform mass distribution. Further, with the electrolyte membrane 2, at the gas inlet periphery 211 and the gasket frame peripheral portion 212 where expansion and contraction frequently take place, particularly the mass of PVDF nonwoven fibers per unit area is greater than the mass of nonwoven fibers per unit area in the region 221 corresponding to the center portion of the gasket frame. Since the PVDF nonwoven fibers function as the reinforce member of the electrolyte membrane 2, expansion incurred by impregnation of water can be restricted. Thus, deterioration of the membrane can be suppressed.

As shown in the reference example, the deterioration of the electrolyte membrane 2 is significant at the region 211 near the fuel gas inlet. Accordingly, with the electrolyte membrane 2 according to the first embodiment, it is desirable that the mass of the nonwoven fibers per unit area of the reinforce membrane 22 of the region having a length of 10% to 40% of the distance from the fuel gas inlet 3 to the side 34 of the gasket frame opposing to the side 31 of the gasket frame provided with the fuel gas inlet 3 is set to be greater than the mass of the nonwoven fibers per unit area in the region 221 corresponding to the center portion of the gasket frame. Thus, the electrolyte membrane 2 deteriorating significantly at the fuel gas inlet periphery can be reinforced. In the case where the mass of the nonwoven fibers per unit area of the reinforce membrane 22 at the fuel gas inlet periphery is small, variations of size of the electrolyte membrane 2 due to expansion and contraction cannot be suppressed, and deterioration of the membrane cannot be prevented. On the other hand, in the case where the area of the region with great mass of the nonwoven fibers per unit area is excessively great, proton conduction is inhibited. This becomes a factor of a reduction in power generation efficiency.

Note that, at the boundary between the region where the mass of the nonwoven fibers per unit area is great and the region where the mass per unit area is small, the stress concentration does not easily occur at the reinforce membrane 22, when the mass is varied continuously. Hence, durability becomes high.

<As to Nonwoven Fibers>

The PVDF nonwoven fibers according to the first embodiment can be prepared through electrospinning. The mass of the PVDF nonwoven fibers per unit area prepared through electrospinning is the smallest at the center portion 221 of the power generating region 21 and the greatest at the fuel gas inlet periphery 211 and the periphery of the sides 32 to 34 of the gasket frame. The PVDF nonwoven fibers are in the shape in which the fibers are overlapping one another in a web-like manner, the mass of the nonwoven fibers per unit area being desirably 0.1 mg/cm$^2$ or more. When the mass of the nonwoven fibers per unit area is small, variations of size of the electrolyte membrane 2 due to expansion cannot be suppressed. Further, the mass per unit area is desirably 1.5 mg/cm$^2$ or less. When the mass per unit area is great, proton propagation through the electrolyte membrane 2 is hindered, and the power generating performance of the fuel cell is inhibited. Note that the mass of the nonwoven fibers per unit area is based on an assumption that the thickness of the electrolyte membrane when prepared as the electrolyte membrane is 5 μm to 40 μm. In connection with the reinforce membrane disposed in the electrolyte membrane of the thickness in this region, provided that the smallest mass of the nonwoven fibers per unit area is 0.1 mg/cm$^2$ and the greatest mass of the nonwoven fibers per unit area is 1.5 mg/cm$^2$, the mass difference of the reinforce membrane per unit area is 15 times, i.e., the greatest. In this case, without reducing the proton conductivity, variations of the size due to dryness and moisture can be suppressed by reducing deterioration of the membrane attributed to variations of the size of membrane when the electrolyte membrane is impregnated with water. In the case where the mass difference of the nonwoven fibers per unit area in the reinforce membrane 22 is greater than 15 times described above, the smallest mass per unit area turns out to be 0.1 mg/cm$^2$ or less, whereby variations of the size due to dryness and moisture cannot be suppressed. Alternatively, the greatest mass per unit area turns out to be 1.5 mg/cm$^2$ or more, whereby proton conductivity is reduced.

In the case where the thickness of the electrolyte membrane 2 is further greater, the thickness of the nonwoven fibers should be increased. In the case where the thickness of the electrolyte membrane is further greater also, the mass difference of the nonwoven fibers per unit area in the reinforce membrane should be set to 15 times or less.

The electrolyte membrane 2 including therein the PVDF nonwoven fibers can generate power as a fuel cell, by protons propagating through the electrolyte material portion packed in the void portion with no PVDF nonwoven fibers. At the center portion 221 of the power generating region 21, the mass of the PVDF nonwoven fibers per unit area is small and the proportion of the void portion with no PVDF nonwoven fibers is great. Therefore, proton propagation actively occurs and sufficient power generation is performed. Near the fuel gas inlet 3 or near the sides 32 to 34 of the gasket frame, the mass of the PVDF nonwoven fibers per unit area is great. Therefore, the PVDF nonwoven fibers serving as the reinforce member of the electrolyte membrane 2 are great in number, whereby variations of size due to expansion and contraction can be suppressed and durability of the electrolyte membrane 2 can be secured.

Since the electrolyte membrane 2 reaches approximately 80° C. when the fuel cell is in operation, it is preferable to employ PVDF as the nonwoven fibers, for its full heat resistance even in the temperature range noted above, chemically stable property, and capability of being turned into nonwoven fibers through electrospinning.

Note that, as the nonwoven fibers, in addition to PVDF, copolymer made of a plurality of units of monomer structuring polymer such as PVDF or PVF, e.g., polyvinyl fluoride polymer (hereinafter referred to as PVF), mixture of such polymers and the like can be used. Further, the nonwoven fibers should be made of a material being heat resistant and chemically resistant, and being capable of being subjected to electrospinning. Further, the nonwoven fibers are further preferably made of a hydrophobic material. Disposing the nonwoven fibers made of a hydrophobic material in the electrolyte membrane 2, the unnecessary water generated in the electrolyte membrane 2 by a power generation reaction can be discharged. Thus, unnecessary expansion due to the generated water can be reduced. In the first embodiment, for the purpose of reducing the variations of size due to expansion and contraction of the electrolyte membrane 2, it is desirable that the mechanical properties such as tensile strength and elongation are excellent. Further, the molecular weight of PVDF used as the nonwoven fibers desirably falls within the range of 150000 to 550000. When the molecular weight is excessively small, the mechanical strength reduces; when the molecular weight is excessively great, solubility reduces, and it becomes difficult to obtain a solution.

<As to Preparation of Nonwoven Fibers>

In the first embodiment, in order to subject PVDF to electrospinning to obtain nonwoven fibers, PVDF is dissolved using dimethylacetamide (hereinafter referred to as DMAc) as the solvent, to be turned into a solution. The solvent may be dimethyl sulfoxide, dimethylformamide, acetone or the like. When a solvent having polarity is used, dissolution can be achieved with ease. The desirable solution concentration range is 10% to 25%. When the solution concentration is low, sufficient fiber diameter cannot be obtained, and variations of size due to expansion and contraction of the electrolyte membrane 2 cannot be suppressed. Further, when the solution concentration is higher than the range noted above, sufficient electrostatic burst cannot be achieved in obtaining the nonwoven fibers through electrospinning. The spaces among the fibers are eliminated, and hence proton conduction as one function of the electrolyte membrane 2 is inhibited.

Figure 3:
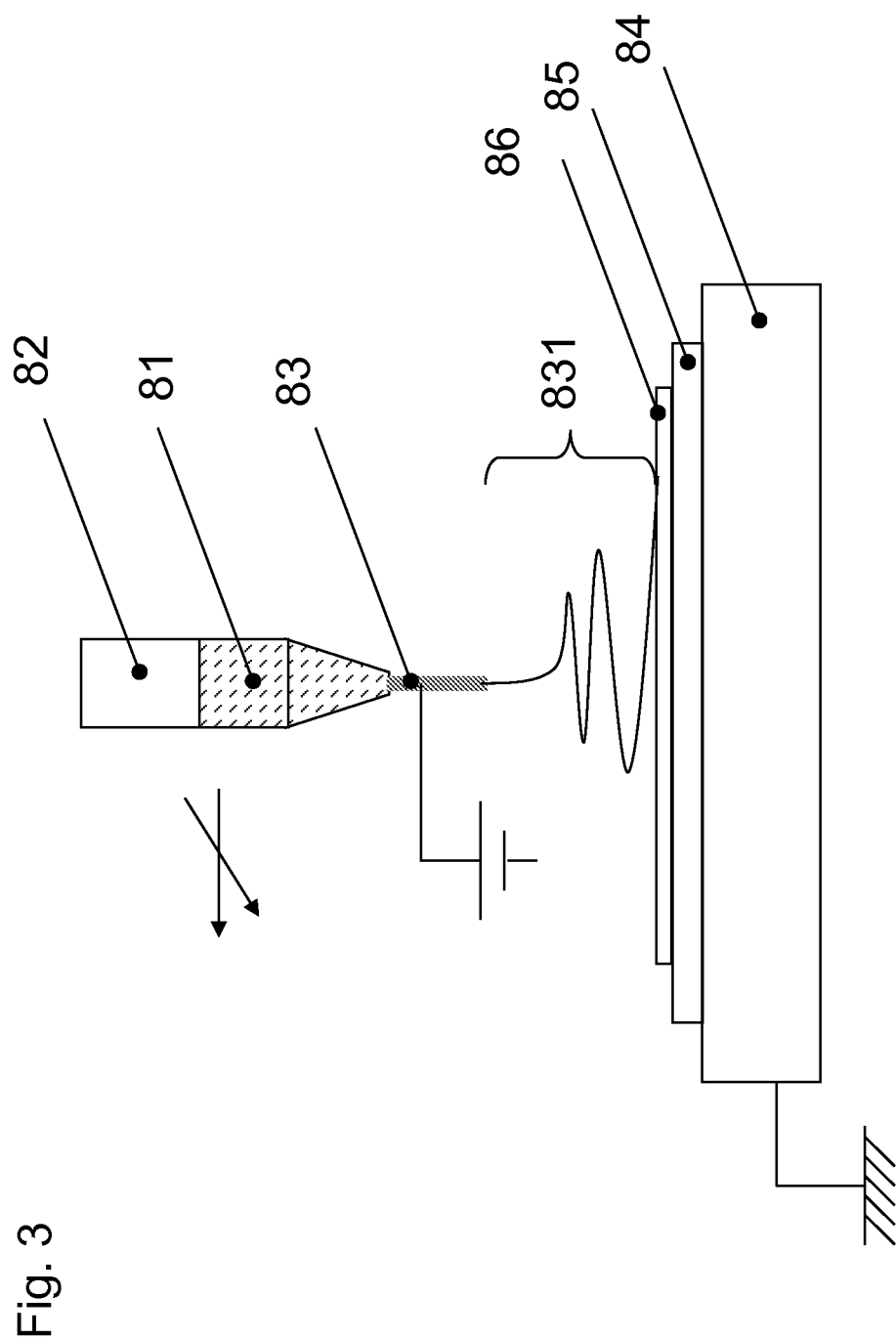
FIG. 3 is a schematic diagram of a nonwoven fiber production facility used in the present embodiment.

FIG. 3 is a schematic diagram of the facility for obtaining the PVDF nonwoven fibers according to the first embodiment.

According to the first embodiment, in obtaining the nonwoven fibers of PVDF through electrospinning, a PVDF solution 81 is put into a syringe 82. A solution discharge nozzle 83 is provided at the bottom portion of the syringe 82. A needle-like nozzle 83 is used as the solution discharge nozzle. The desirable nozzle inner diameter falls within a range of $\phi 0.18$ mm to $\phi 0.42$ mm. When the nozzle inner diameter is small, the discharge amount becomes small. Therefore, the productivity reduces. Further, when the nozzle inner diameter is increased, the discharge amount becomes great and the electrostatic burst cannot take place appropriately. Hence, fibers cannot be obtained.

Further, an air pulse dispenser (not shown) may be used for discharging. A desirable range of the solution delivery pressure is from 10 kPa to 50 kPa. When the solution delivery pressure is low, the PVDF solution 81 is not discharged enough and the productivity reduces. Further, when the solution delivery pressure is increased, the discharge amount becomes great and the electrostatic burst cannot take place appropriately. Hence, fibers cannot be obtained. Since the discharge amount varies depending on the viscosity of the solution, when the viscosity is high, the solution delivery pressure should be increased; when the viscosity is low, the solution delivery pressure should be reduced. Thus, the solution delivery pressure should be controlled such that an appropriate discharge amount is achieved.

Further, voltage is applied to the nozzle 83, and a collector 84 collecting the fibers is connected to the ground. The electric field between the nozzle 83 and the collector 84 desirably falls within a range of 10 kV to 50 kV. When the electric field is weak, sufficient electrostatic burst cannot be achieved, and hence appropriate fibers cannot be obtained. Further, when the electric field is intense, the time taken by the PVDF solution 81 discharged from the nozzle 83 to reach the collector 84 becomes short. Accordingly, sufficient electrostatic burst cannot be achieved and hence appropriate fibers cannot be obtained. Note that, though positive voltage is applied to the nozzle 83 in the example described above, in some cases, negative charge should be applied to the nozzle 83 depending on the material from which nonwoven fibers are to be obtained. Accordingly, the polarity of voltage to be applied should be selected depending on the material.

Further, the distance 831 between the tip of the nozzle 83 and the collector 84 desirably falls within a range of 90 mm to 160 mm. When the distance 831 between the tip of the nozzle 83 and the collector 84 is short, the time taken by the PVDF solution 81 discharged from the nozzle 83 to reach the collector 84 becomes short. Accordingly, sufficient electrostatic burst cannot be achieved, and appropriate fibers cannot be obtained.

The electrostatic burst is influenced by the viscosity or amount of the solution. When the nonwoven fibers are generated at the collector 84, the optimum applied voltage or the distance between the nozzle 83 and the collector 84 can be determined based on the degree of dryness of the solvent of the solution. When the solvent of the nonwoven fibers generated at the collector 84 is not fully dry but wet, the electrostatic burst is insufficient. Accordingly, the discharge amount from the nozzle 83 should be reduced to achieve an appropriate discharge amount. Further, an increase in the distance between the nozzle 83 and the collector 84 likewise facilitates an occurrence of appropriate electrostatic burst. When the discharge amount cannot be reduced in consideration of achieving high productivity, the distance between the nozzle 83 and the collector 84 may be increased.

When the discharge amount is small or when the distance between the nozzle 83 and the collector 84 is great, an excessive electrostatic burst takes place, and the nonwoven fibers are formed at a region wider than a prescribed region. Accordingly, since it takes time to form a required thickness, a reduction in productivity is invited.

A plurality of nozzles (not shown) may be used for improving productivity. The distance between the nozzles is desirably 10 mm or more. When the distance between the nozzles is short, the adjacent nozzles and the charged PVDF solution 81 are influenced by the charges of each other's. Then, sufficient electrostatic burst cannot be achieved and hence appropriate fibers cannot be obtained.

Figure 4:
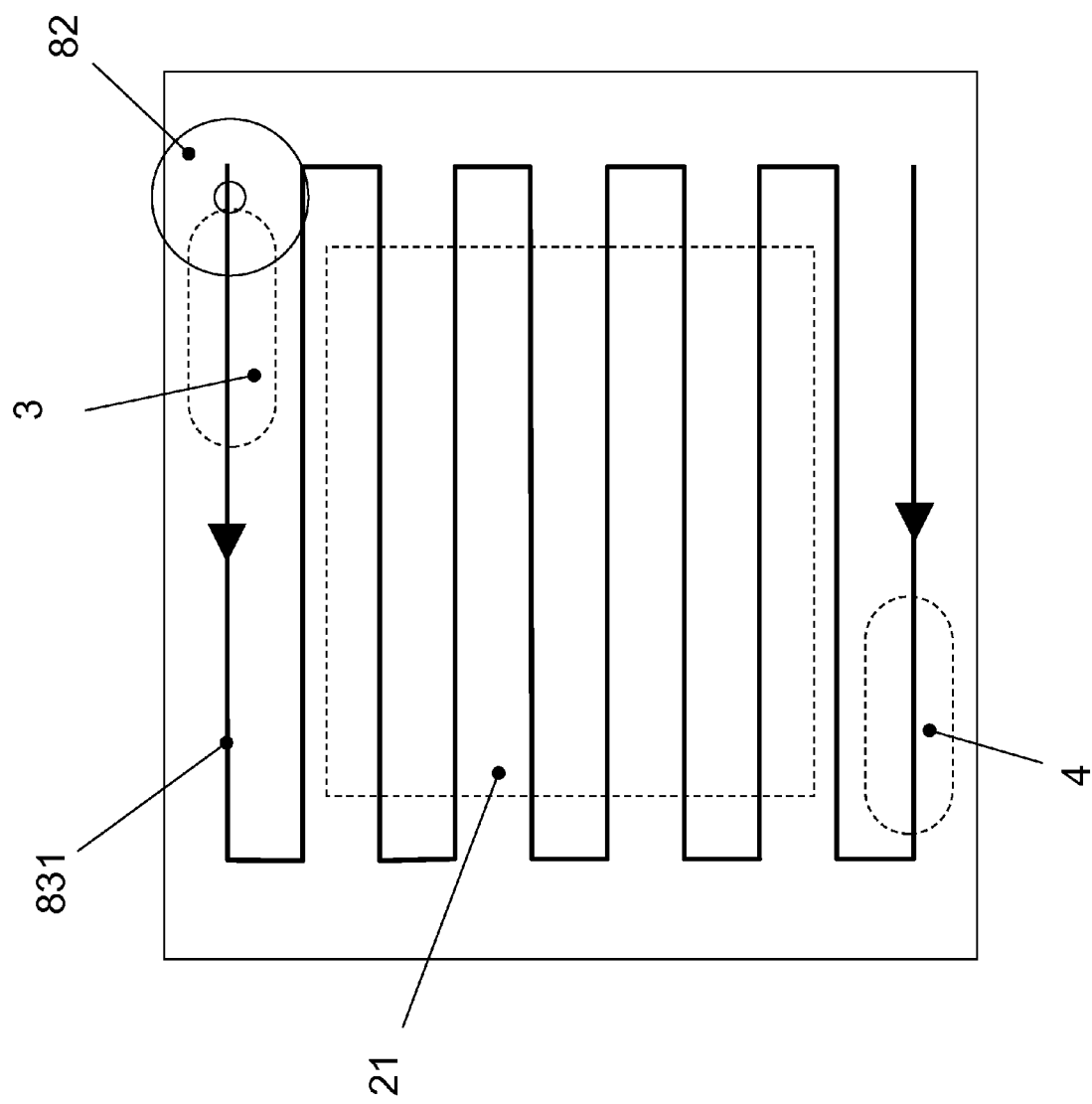
FIG. 4 is a schematic diagram of a nozzle scan track in preparing nonwoven fibers of uniform thickness according to the first embodiment.

FIG. 4 is a schematic diagram of a nozzle scan track according to the first embodiment. In the first embodiment, the nozzle 83 is scanned at a constant speed on the collector 84 along a nozzle scanning pattern 832 so that a layer of nonwoven fibers of uniform thickness is obtained. Thus, nonwoven fibers of a prescribed thickness are prepared. The scanning speed is desirably 50 mm/s or less. When the scanning speed is high, the nonwoven fibers accumulated on the collector 84 are deposited under the tensile force attributed to scanning. Therefore, the internal stress is remained, and this may cause the electrolyte membrane 2 to contract. Further, though a plurality of needle-like nozzles 83 are used in the first embodiment, the present invention is not limited thereto, and a block-like nozzle 83 provided with a plurality of discharging holes may be used. This makes it possible to form uniform electrostatic field without being influenced by the difference among individual nozzles 83, and to form homogeneous nonwoven fibers.

Figure 7:
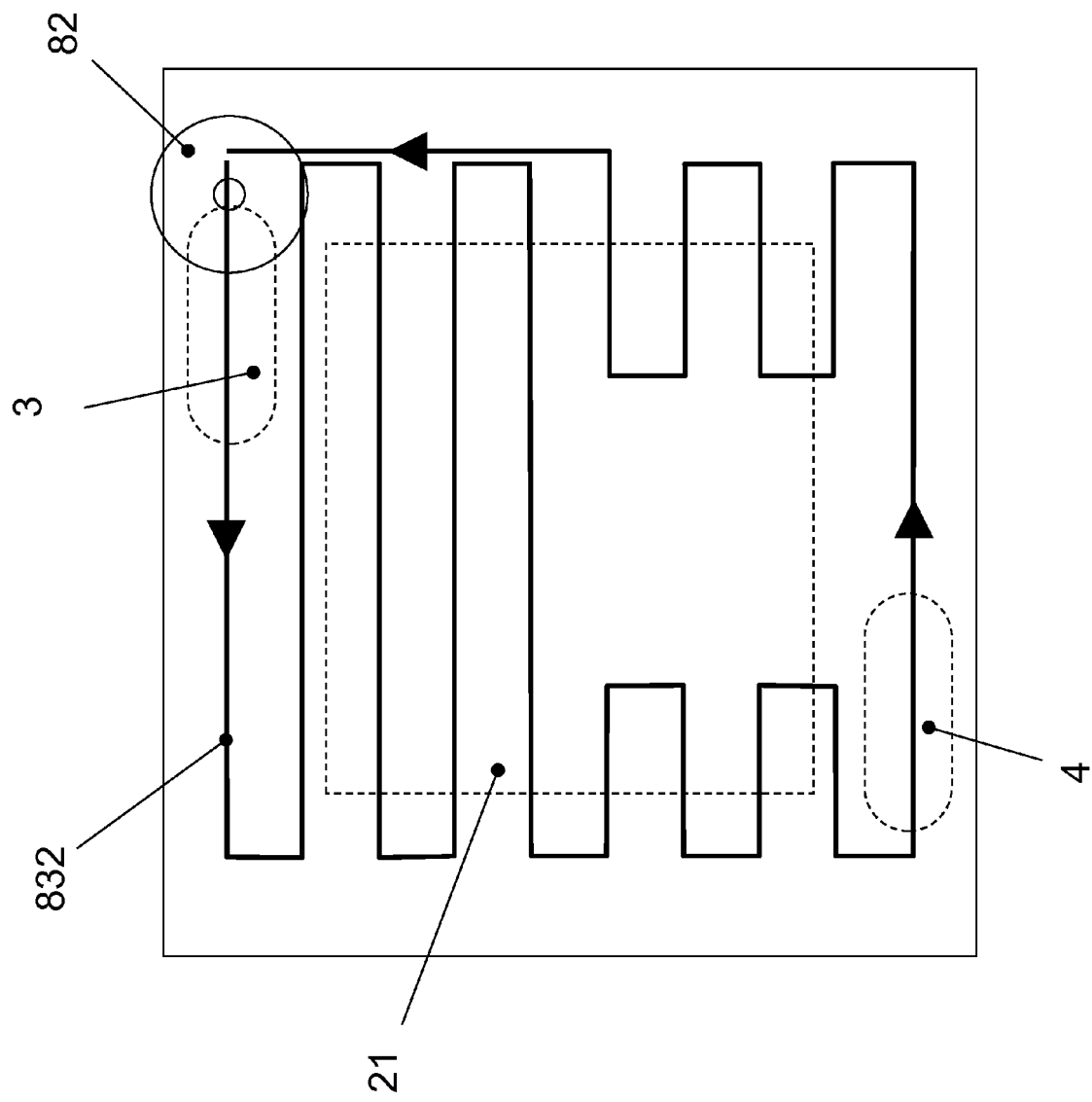
FIG. 7 is a schematic diagram of nozzle scan track in providing thickness variation in the nonwoven fibers according to the first embodiment.
Figure 8:
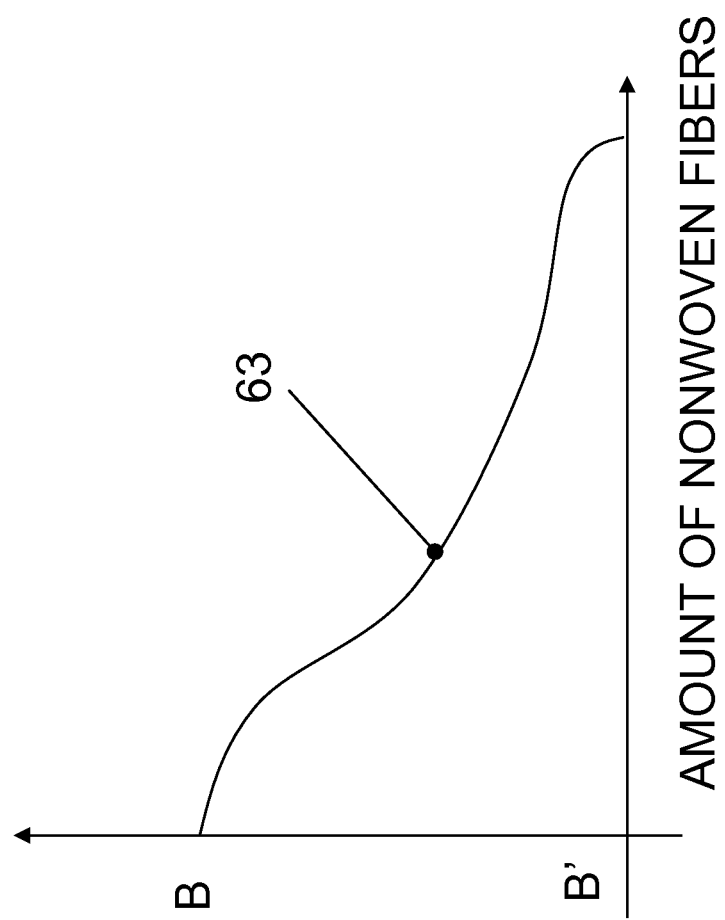
FIG. 8 is a schematic diagram of nonwoven fiber amount distribution in the membrane thickness direction of the membrane electrode assembly shown in FIG. 1 prepared in the process shown in FIG. 7.

FIG. 5A shows the coating weight distribution (mass distribution) of the nonwoven fibers per unit area in the plane of the electrolyte membrane according to the first embodiment, whereas FIG. 5B is a schematic diagram of the thickness distribution of the nonwoven fibers. FIGS. 6A to 6C are schematic diagrams of a PVDF nonwoven fibers preparation process according to the first embodiment. FIG. 7 is a schematic diagram of the nozzle scan track in providing thickness variations to the nonwoven fibers shown in FIG. 6C. FIG. 8 is a schematic diagram of the density distribution of the nonwoven fibers in the thickness direction of the electrolyte membrane 2 according to the first embodiment.

(a) Firstly, a PET film 85 having its front surface subjected to antistatic treatment is prepared (FIG. 6A).

(b) Next, PVDF nonwoven fibers 86 are accumulated on the PET film 85. In this case, in order to obtain the size required as the electrolyte membrane 2, the nozzle is scanned over a region greater than the region to be used as the electrolyte membrane 2 (FIG. 6B). Thus, on the entire region greater than the region to be used as the electrolyte membrane 2, nonwoven fibers 861 with uniform thickness are prepared. The thickness is equivalent to the thickness of the reinforce membrane 22 at the center portion 221 of the power generating region.

(c) Thereafter, nonwoven fibers 862 are deposited only on the periphery of the sides 32 to 34 of the gasket frame and the region 211 near the fuel gas inlet of the electrolyte membrane 2, to increase the thickness of the nonwoven fibers 862 at the periphery of the sides 32 to 34 of the gasket frame and the region 211 near the fuel gas inlet relative to the center portion 221 of the power generating region 21 (FIG. 6C). Specifically, after the nonwoven fibers 861 with uniform membrane thickness are prepared, the nozzle 83 is scanned as shown by the nozzle scanning pattern 832 shown in FIG. 7, so that the nonwoven fibers 862 are deposited only at the periphery of the sides 32 to 34 of the gasket frame and the region corresponding to the region 211 near the fuel gas inlet. Thus, as shown in FIG. 5B, the thickness of the PVDF nonwoven fibers 86 can be made the smallest at the center portion 221 of the power generating region 21. Further, the thickness of the PVDF nonwoven fibers can be made the greatest at the outer circumferential portion of the region, which is greater than the region to be used as the electrolyte membrane 2, and the other region covering from the side 32 of the gasket frame opposing to the side 31 of the gasket frame on the fuel gas inlet 3 side.

Thus, as shown in FIG. 8, the distribution of the nonwoven fibers 86 becomes asymmetric distribution 61 about the center of the thickness of the electrolyte membrane 2.

Note that, without being limited to the example shown in FIG. 6, non-uniform mass distribution of the nonwoven fibers in the plane of the electrolyte membrane 2 may be implemented as shown in other example shown in FIG. 9A to 9D. In the following, the other example is described.

Figure 9A:
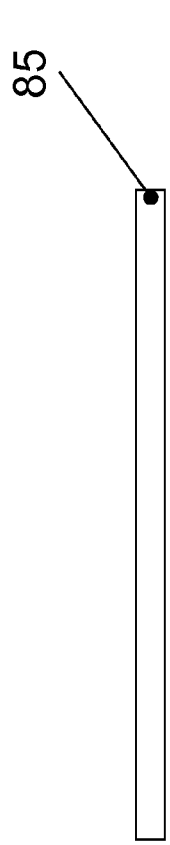
FIGS. 9A to 9D are other process schematic diagrams of preparing PVDF nonwoven fibers according to the first embodiment.

(a) Firstly, a PET film 85 having its front surface subjected to antistatic treatment is prepared (FIG. 9A).

Figure 9B:
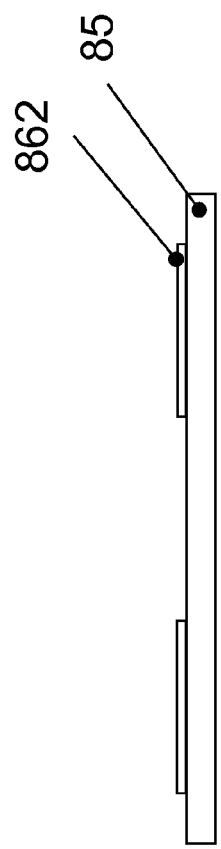

(b) In advance, nonwoven fibers 862 are deposited only on the periphery of the sides 32 to 34 of the gasket frame and the region 211 near the fuel gas inlet (FIG. 9B).

Figure 9C:
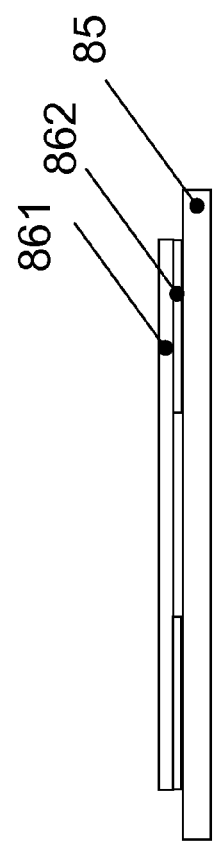

(c) Next, nonwoven fibers 861 are prepared over the entire region greater than the region to be used as the electrolyte membrane 2 (FIG. 9C).

Figure 9D:
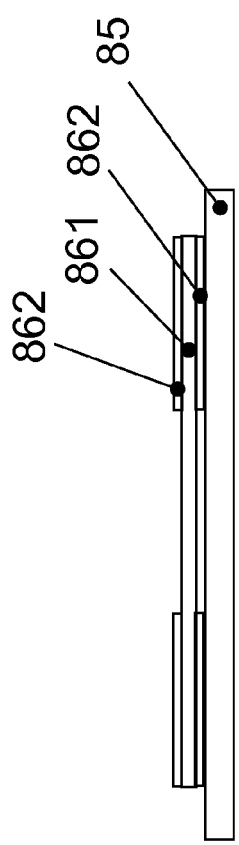

(d) Again, the nonwoven fibers 862 are deposited only on the periphery of the sides 32 to 34 of the gasket frame and the region 211 near the fuel gas inlet (FIG. 9D).

Figure 10:
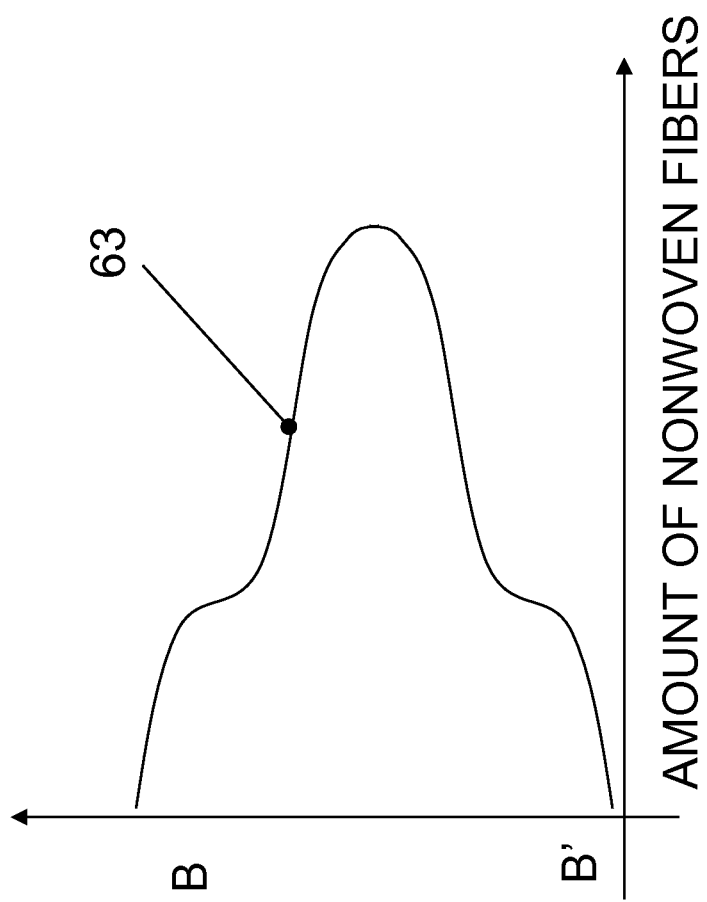
FIG. 10 is a schematic diagram of nonwoven fiber amount distribution in the membrane thickness direction of the membrane electrode assembly shown in FIG. 1 prepared in the process shown in FIG. 9.

Thus, as shown in FIG. 10, the electrolyte membrane 2 whose mass distribution 62 of the nonwoven fibers per unit area is line symmetric in the thickness direction of the membrane relative to the thickness center portion of the electrolyte membrane 2 can be obtained. As a result, the difference in variations of size of the electrolyte membrane 2 due to expansion and contraction at the front surface and the back surface can be reduced.

FIG. 11 is a schematic diagram of an applying process of electrolyte solution 87 according to the first embodiment.

(a) The obtained PVDF nonwoven fibers 86 are impregnated with the electrolyte solution 87. Preferably, the electrolyte solution 87 is a mixture solvent of water and ethanol. Further, in order to impregnate the PVDF nonwoven fibers 86 with the electrolyte solution 87, the proportion of water in the solvent is desirably half or less. When the water proportion in the solvent is high, since PVDF is hydrophobic, the solution may not be appropriately applied in some cases.

(b) Next, using a bar coater (not shown), the electrolyte solution 87 is applied to the nonwoven fibers 86. Note that the applying method of the electrolyte solution 87 is not limited to use of the bar coater. For example, application through use of a slit die, printing, spraying or the like may be employed. Further, it is preferable that the nonwoven fibers 86 with high voidage are impregnated with the electrolyte solution 87 so as to eliminate the voids.

(c) Next, after the electrolyte solution 87 is applied, the solvent is evaporated, to dry the solution.

(d) Further, the electrolyte solution 87 is applied such that the dried electrolyte 2 has a prescribed thickness.

(e) Thereafter, after the applied electrolyte solution 87 has dried, annealing is performed, to crystallize the electrolyte. By crystallizing the electrolyte, durability can be improved. Note that, it is desirable that the annealing temperature is higher than the glass transition temperature of the electrolyte material by 10° C. or more. When the annealing temperature is excessively low, sufficient crystallization cannot be achieved, and durability of the electrolyte membrane 2 cannot be secured. Further, it is desirable that the annealing time is performed for 30 minutes or more and two hours or less. When the annealing time is short, sufficient crystallization cannot be achieved. On the other hand, when the annealing time is long, since crystallization excessively progresses, proton electrical conductivity becomes low.

(f) After annealing, the PET substrate 85 is peeled off, to obtain the electrolyte membrane 2.

Figure 12A:
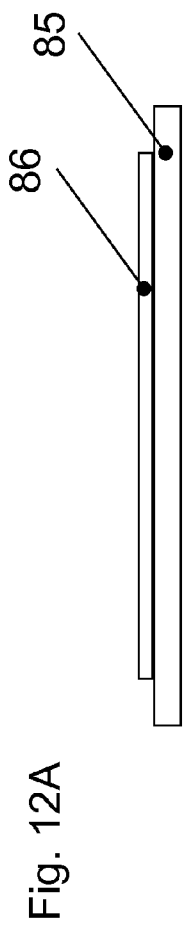
FIGS. 12A to 12E are other schematic diagrams of the electrolyte material applying process for the electrolyte membrane according to the first embodiment.
Figure 12B:
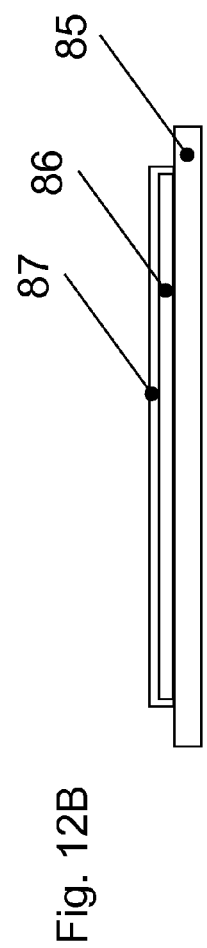

Note that, without being limited to the example shown in FIGS. 11A to 11F, the electrolyte solution may be applied as in other example shown in FIG. 12A to 12E. In the following, a description will be given of the other example. In the other example, the process proceeds similarly to FIG. 11A to FIG. 11F, and then the process following the FIG. 11F, i.e., peeling, is shown. Accordingly, FIGS. 12A and 12B are substantially identical to FIG. 11A and 11B.

Figure 12C:
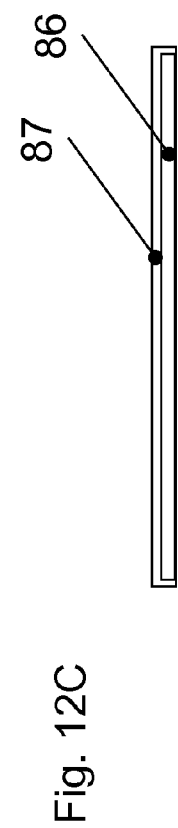

(g) The membrane, which is the nonwoven fibers 86 including one surface to which the electrolyte solution 87 has been applied, is peeled off from the PET substrate (FIG. 12C).

Figure 12D:
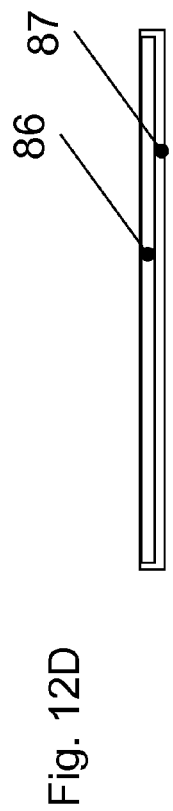

(h) After the membrane being the nonwoven fibers 86 including one surface to which the electrolyte solution 87 has been applied is peeled off, the surface having originally been on the PET substrate 85 side is placed face up (FIG. 12D).

Figure 12E:
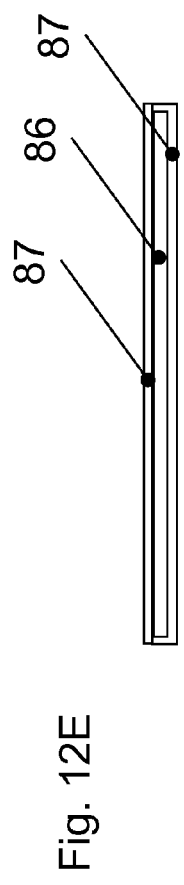

(i) The electrolyte solution 87 is applied again to the surface having originally been on the PET substrate 85 side (FIG. 12E).

Thus, it becomes possible to dispose the PVDF nonwoven fibers 86 at the center portion in the thickness direction of the electrolyte membrane 2. Accordingly, it becomes possible to reduce the difference in variations of size of the electrolyte membrane 2 at the front surface and the back surface when the electrolyte membrane 2 expands and contracts.

Figure 13A:
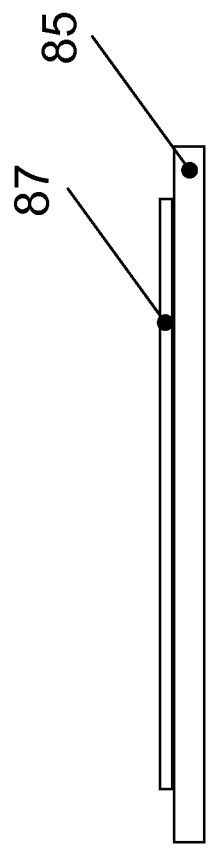
FIGS. 13A to 13C are other schematic diagrams of the electrolyte material applying process for the electrolyte membrane according to the first embodiment.
Figure 13B:
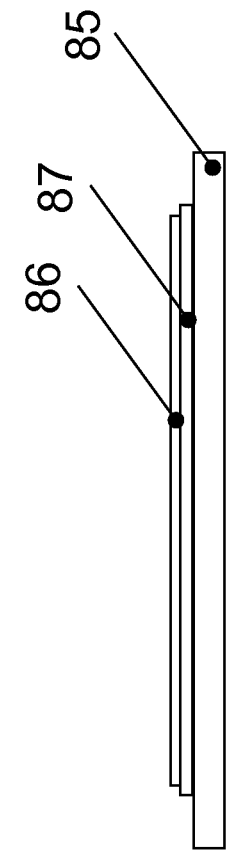
Figure 13C:
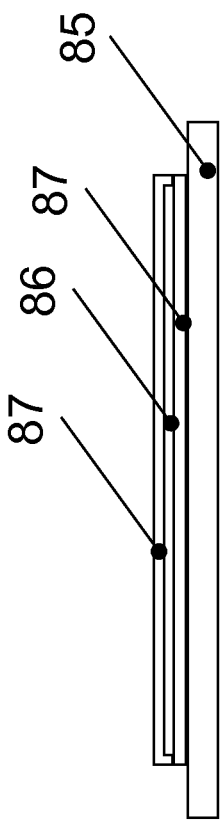

Further, the electrolyte solution may be applied as shown in other example shown in FIGS. 13A to 13C. In the following, a description will be given of the other example.

(a) In advance, an electrolyte solution 87 is applied to a PET substrate 85 (FIG. 13A).

(b) PVDF nonwoven fibers 86 are formed on the electrolyte solution 87 by electrospinning (FIG. 13B).

(c) Thereafter, the electrolyte solution 87 is applied such that the voids of the PVDF nonwoven fibers are packed with the electrolyte solution 87 (FIG. 13C).

Thus, it becomes possible to dispose the PVDF nonwoven fibers 86 at the center portion in the thickness direction of the electrolyte membrane 2 without peeling off the electrolyte membrane 2 from the PET substrate 85. Accordingly, the process can be simplified.

Further, after the electrolyte solution 87 is applied to the PET substrate 85, when the PVDF nonwoven fibers 86 is formed on the electrolyte solution 87, the PVDF nonwoven fibers 86 may be formed in the state where the electrolyte solution 87 is dried. Alternatively, the PVDF nonwoven fibers 86 may be formed on the electrolyte solution 87 not being dried. In the latter case, when the PVDF nonwoven fibers 86 are formed on the electrolyte solution 87 not being dried, the formed PVDF nonwoven fibers 86 sink into the electrolyte solution 87 having been applied in advance. In this case, the PVDF nonwoven fibers 86 exist across the electrolyte solution 87 having been applied in advance to the PET substrate 85 and the electrolyte solution 87 applied after the PVDF nonwoven fibers 86 are formed. As a result, the interface between the electrolyte solution 87 having been applied in advance and the electrolyte solution 87 applied after the PVDF nonwoven fibers 86 are formed is reinforced by the PVDF nonwoven fibers 86. Thus, it becomes possible to suppress the disadvantageous peeling that occurs at the interface between the electrolyte solution 87 having been applied in advance and the electrolyte solution 87 applied after the PVDF nonwoven fibers 86 are formed.

In the first embodiment, by controlling the scanning speed or the scanning method of the nozzle, the mass of the nonwoven fibers per unit area is controlled. Note that, in addition to the foregoing, it is also possible to narrower the fiber diameter of the nonwoven fibers such that PVDF nonwoven fibers, for example, are highly densely overlaid one another. In this case, it becomes possible to change the mass of the nonwoven fibers per unit area while maintaining the maximum thickness of the nonwoven fibers to be small. Thus, the present invention is also applicable to the electrolyte membrane with small thickness.

Further, a reduction in the fiber diameter of each of the nonwoven fibers can be realized by the process conditions such as: reducing the solution concentration; reducing the nozzle diameter; reducing the solution delivery pressure; increasing the applied voltage; increasing the spinning distance, and the like.

Note that, though the first embodiment is applied to the membrane electrode assembly having the serpentine-like fuel gas flow channel in the separator, it is also applicable to a membrane electrode assembly having a straight fuel gas flow channel.

(Second Embodiment)

Figure 14:
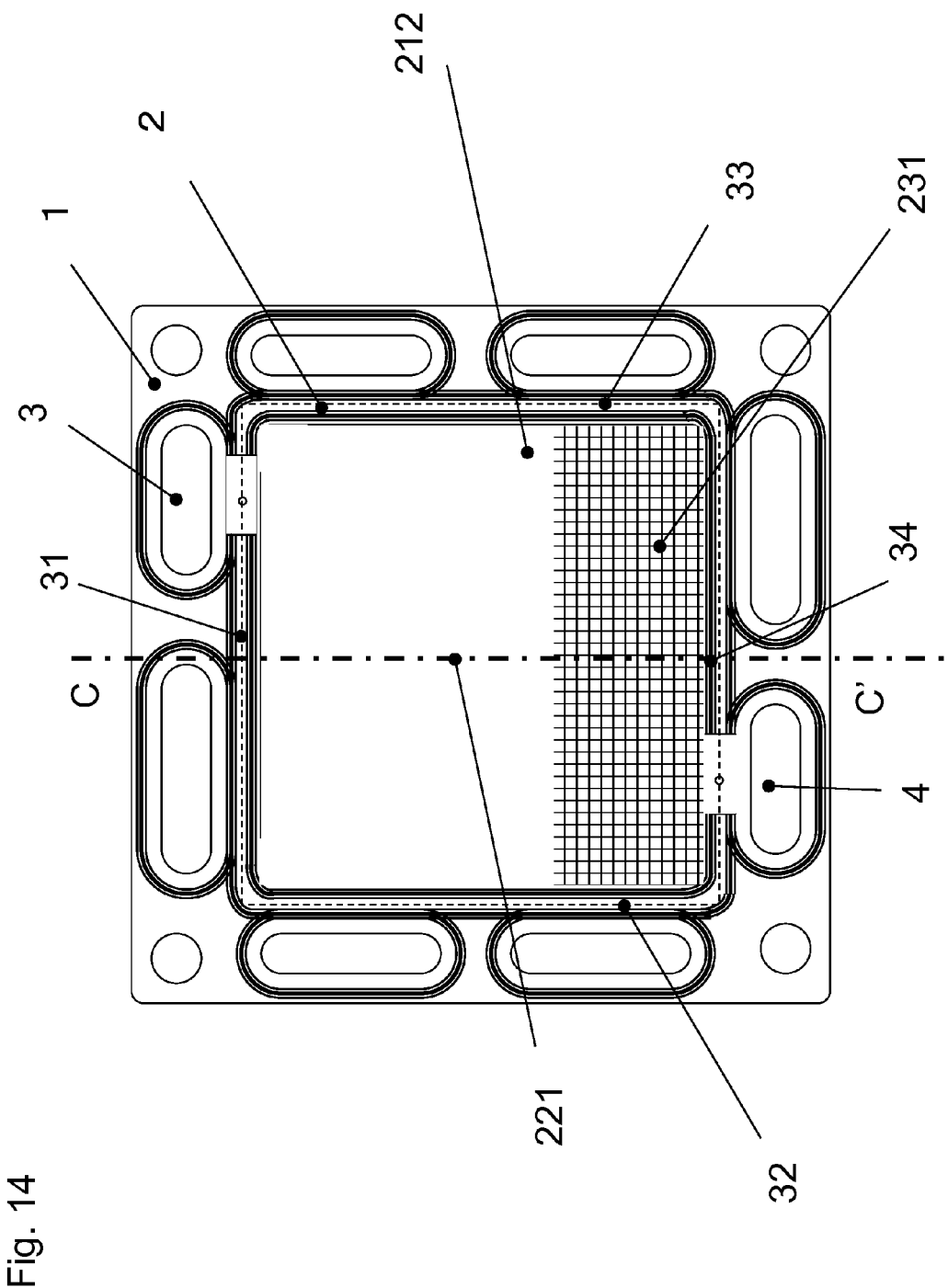
FIG. 14 is a schematic diagram of a membrane integrated frame element using an electrolyte membrane according to a second embodiment.
Figure 15:
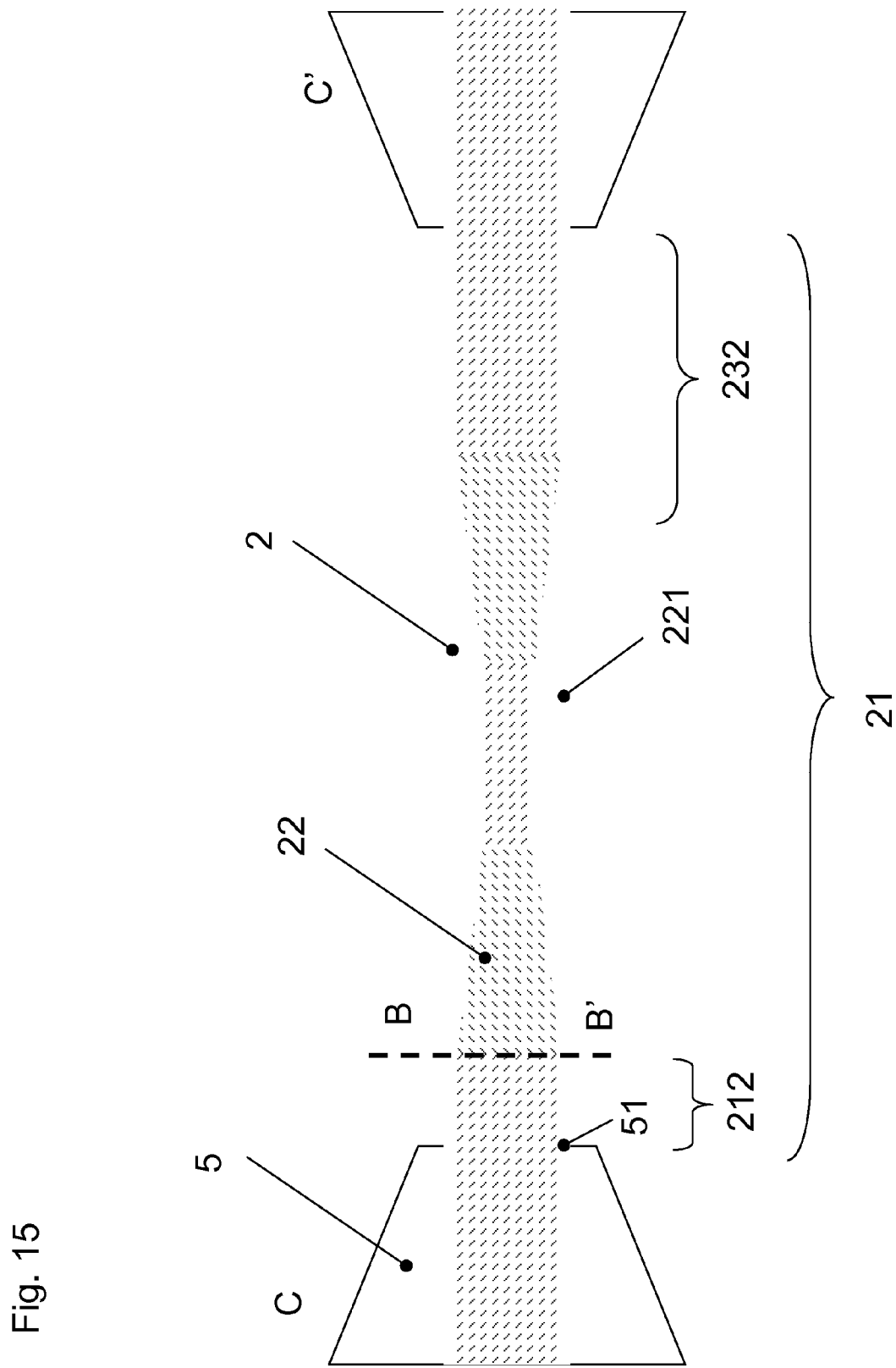
FIG. 15 is a schematic diagram of cross section B-B' of the membrane electrode assembly shown in FIG. 2.

FIG. 14 is a schematic diagram of a membrane integrated frame element 1 using an electrolyte membrane 2 for solid polymer fuel cell according to a second embodiment of the present invention. FIG. 15 is a schematic diagram of cross section C-C' of the electrolyte membrane 2 according to the second embodiment shown in FIG. 14. As compared to the electrolyte membrane according to the first embodiment, the electrolyte membrane 2 according to the second embodiment is identical in that the nonwoven fibers have non-uniform mass distribution in the plane of the electrolyte membrane. On the other hand, the electrolyte membrane 2 according to the second embodiment is particularly characterized by including therein a reinforce membrane 22 in which the mass of nonwoven fibers per unit area is greater than the mass of the nonwoven fibers per unit area in a region 221 corresponding to the center portion of the gasket frame in a region 231 near the fuel gas outlet and a gasket frame peripheral portion 212.

The electrolyte membrane 2 according to the second embodiment is suitable for the case in which the fuel cell is operated using the fuel gas in the low-humidified state, since the mass of the nonwoven fibers per unit area in the region 231 near the fuel gas outlet and the gasket frame peripheral portion 212 is greater than the mass of the nonwoven fibers per unit area in the region 221 corresponding to the center portion of the gasket frame.

(Reference Example)

FIG. 17 is a schematic diagram of a membrane electrode assembly according to a reference example. FIG. 18 is a schematic diagram showing the cross section of a membrane integrated frame element 1 using an electrolyte membrane 2 according to the reference example. In the case where the membrane integrated frame element 1 according to the reference example is operated using the fuel gas in the low-humidified state, the water generated by a power generation reaction near the fuel gas inlet 3 shifts toward the fuel gas outlet 4, to moisturize the electrolyte membrane 2 around the fuel gas outlet 4. Accordingly, a power generation reaction actively occurs in the electrolyte membrane 2 around the fuel gas outlet 4. Further, the moisturization of the electrolyte membrane 2 by the water generated by the power generation reaction around the fuel gas outlet 4 also occurs. Therefore, the water content in the electrolyte membrane 2 at the fuel gas outlet 4 becomes relatively greater than the water content in the electrolyte membrane 2 at the fuel gas inlet 3 in the power generating region 21 of the electrolyte membrane 2 in a single membrane integrated frame element 1. As a result, around the fuel gas outlet 4, expansion due to the generated water and contraction due to dryness in the situation where the operation of the fuel cell is stopped are repeated. Hence, particularly at the periphery of the fuel gas outlet 4, deterioration of the electrolyte membrane is accelerated.

The electrolyte membrane 2 is retained by gaskets 5, and the electrolyte membrane 2 and the gaskets 5 are clamped by the separators (not shown). Power is generated at the power generating region 21 not being fixed to the gaskets 5 of the electrolyte membrane 2. Water is generated by the power generation, and the power generating region 21 in the electrolyte membrane 2 repeats expansion due to water impregnation and contraction due to dryness when operation is stopped. Therefore, deterioration of the membrane is invited at a fixed boundary portion 51 between the sides 31 to 33 of the gasket frame and the electrolyte membrane 2.

Further, with the electrolyte membrane 2 according to the reference example, in the serpentine-like flow channel that is folded three times and that extends from the fuel gas outlet 4 to the separator (not shown), deterioration of the electrolyte membrane 2 is significant in the region reaching the flow channel pattern portion before being folded three times.

On the other hand, the electrolyte membrane 2 according to the second embodiment has the reinforce membrane 22 containing the PVDF nonwoven fibers, which function as a whole as the reinforce member, with non-uniform mass distribution. Further, with the electrolyte membrane 2, at the fuel gas outlet periphery 231 and the gasket frame peripheral portion 212 where expansion and contraction frequently take place, particularly the mass of the PVDF nonwoven fibers per unit area is great. Accordingly, in particular, expansion caused by impregnation of water at the electrolyte membrane at the fuel gas outlet periphery can be restricted, whereby deterioration of the membrane can be suppressed.

As shown in the reference example, the deterioration of the electrolyte membrane 2 is significant at the fuel gas outlet periphery 231. Accordingly, with the electrolyte membrane 2 according to the second embodiment, it is desirable that the mass of the nonwoven fibers of the reinforce membrane 22 per unit area of the region having a length of 10% to 40% of the distance from the fuel gas outlet 4 to the side 31 of the gasket frame opposing to the side 34 of the gasket frame provided with the fuel gas outlet 4 is set to be greater than the mass of the nonwoven fibers per unit area of the region 221 corresponding to the center portion of the gasket frame. Thus, the electrolyte membrane 2 deteriorating significantly at the fuel gas outlet periphery 231 can be reinforced. In the case where the mass of the nonwoven fibers per unit area of the reinforce membrane 22 at the fuel gas outlet periphery 231 is small, variations of size of the electrolyte membrane 2 due to expansion and dryness cannot be suppressed, and deterioration of the membrane cannot be prevented. On the other hand, in the case where the area of the region with great mass of the nonwoven fibers per unit area is excessively great, proton conduction is inhibited. This becomes a factor of a reduction in power generation efficiency.

Note that, at the boundary between the region where the mass of the nonwoven fibers per unit area is great and the region where the mass per unit area is small, the stress concentration does not easily occur at the reinforce membrane 22, when the mass is continuously varied. Hence, durability becomes high.

<As to Nonwoven Fibers>

The PVDF nonwoven fibers according to the second embodiment can be prepared through electrospinning. The mass of the PVDF nonwoven fibers per unit area prepared through electrospinning is the smallest at the center portion 221 of the power generating region 21 and the greatest at the fuel gas outlet periphery 231 and the periphery of the sides 31 to 33 of the gasket frame. The PVDF nonwoven fibers are in the shape in which the fibers are overlapping one another in a web-like manner, the mass of the nonwoven fibers per unit area being desirably 0.1 mg/cm$^2$ or more. When the mass of the nonwoven fibers per unit area is small, variations of size of the electrolyte membrane 2 due to expansion cannot be suppressed.

The electrolyte membrane 2 including therein the PVDF nonwoven fibers can generate power as a fuel cell, by protons propagating through the electrolyte material portion packed in the void portion with no PVDF nonwoven fibers. At the center portion 221 of the power generating region 21, the mass of the PVDF nonwoven fibers per unit area is small and the proportion of the void portion with no PVDF nonwoven fibers is great. Therefore, proton propagation actively occurs and sufficient power generation is performed. Near the fuel gas outlet 4 or near the sides 31 to 33 of the gasket frame, the mass of the PVDF nonwoven fibers per unit area is greater than the mass of the reinforce member of the nonwoven fibers per unit area in the region 221 corresponding to the center portion of the gasket frame. As a result, the PVDF nonwoven fibers functioning as the electrolyte membrane 22 become great in number, whereby variations of size due to expansion and contraction can be suppressed and durability of the electrolyte membrane can be secured.

Since the electrolyte membrane 2 reaches approximately 80° C. when the fuel cell is in operation, it is preferable to employ PVDF as the nonwoven fibers, for its full heat resistance even in the temperature range noted above, chemically stable property, and capability of being turned into nonwoven fibers through electrospinning.

Note that, as the nonwoven fibers, in addition to PVDF, copolymer made of a plurality of units of monomer structuring polymer such as PVDF or PVF, e.g., polyvinyl fluoride polymer (hereinafter referred to as PVF), mixture of such polymers and the like can be used. Further, the nonwoven fibers should be made of a material being heat resistant and chemically resistant, and being capable of being subjected to electrospinning. Further, the nonwoven fibers are further preferably made of a hydrophobic material. Disposing the nonwoven fibers made of a hydrophobic material in the electrolyte membrane 2, the unnecessary water generated in the electrolyte membrane 2 by a power generation reaction can be discharged. Thus, unnecessary expansion due to the generated water can be reduced. In the second embodiment, for the purpose of reducing the variations of size due to expansion and contraction of the electrolyte membrane 2, it is desirable that the mechanical properties such as tensile strength and elongation are excellent. Further, the molecular weight of PVDF used as the nonwoven fibers desirably falls within the range of 150000 to 550000. When the molecular weight is excessively small, the mechanical strength reduces; when the molecular weight is excessively great, solubility reduces, and it becomes difficult to obtain a solution.

<As to Preparation of Nonwoven Fibers>

In the second embodiment, in order to subject PVDF to electrospinning to obtain nonwoven fibers, PVDF is dissolved using dimethylacetamide (hereinafter referred to as DMAc) as the solvent, to be turned into a solution. The solvent may be dimethyl sulfoxide, dimethylformamide, acetone or the like. When a solvent having polarity is used, dissolution can be achieved with ease. The desirable solution concentration range is 10% to 25%. When the solution concentration is low, sufficient fiber diameter cannot be obtained, and variations of size due to expansion and contraction of the electrolyte membrane 2 cannot be suppressed. Further, when the solution concentration is higher than the range noted above, sufficient electrostatic burst cannot be achieved in obtaining the nonwoven fibers through electrospinning. The spaces among the fibers are eliminated, and hence proton conduction as one function of the electrolyte membrane 2 is inhibited.

According to the second embodiment, in obtaining the PVDF nonwoven fibers through electrospinning, a PVDF solution 81 is put into a syringe 82. A solution discharge nozzle 83 is provided at the bottom portion of the syringe 82. A needle-like nozzle 83 is used as the solution discharge nozzle. The desirable nozzle inner diameter falls within a range of φ0.18 mm to φ0.42 mm. When the nozzle inner diameter is small, the discharge amount becomes small. Therefore, productivity reduces. Further, when the nozzle inner diameter is increased, the discharge amount becomes great and the electrostatic burst cannot take place appropriately. Hence, fibers cannot be obtained.

Further, an air pulse dispenser (not shown) may be used for discharging. A desirable range of the solution delivery pressure in the syringe 82 for delivering the PVDF solution 81 is from 10 kPa to 50 kPa. When the solution delivery pressure is low, the PVDF solution 81 is not discharged enough and the productivity reduces. Further, when the solution delivery pressure is increased, the discharge amount becomes great and the electrostatic burst cannot take place appropriately.

Hence, fibers cannot be obtained. Since the discharge amount varies depending on the viscosity of the solution, when the viscosity is high, the solution delivery pressure should be increased; when the viscosity is low, the solution delivery pressure should be reduced. Thus, the solution delivery pressure should be controlled such that an appropriate discharge amount is achieved.

Further, voltage is applied to the nozzle 83, and a collector 84 collecting the fibers is connected to the ground. The electric field between the nozzle 83 and the collector 84 desirably falls within a range of 10 kV to 50 kV. When the electric field is weak, sufficient electrostatic burst cannot be achieved, and hence appropriate fibers cannot be obtained. Further, when the electric field is intense, the time taken by the PVDF solution 81 discharged from the nozzle 83 to reach the collector 84 becomes short. Accordingly, sufficient electrostatic burst cannot be achieved and hence appropriate fibers cannot be obtained. Note that, though positive voltage is applied to the nozzle 83 in the second embodiment, negative charge should be applied depending on the material from which nonwoven fibers are to be obtained. Accordingly, the polarity of voltage to be applied should be selected depending on the material.

Further, the distance 831 between the tip of the nozzle 83 and the collector 84 desirably falls within a range of 90 mm to 160 mm. When the distance 831 between the tip of the nozzle 83 and the collector 84 is short, the time taken by the PVDF solution 81 discharged from the nozzle 83 to reach the collector 84 becomes short. Accordingly, sufficient electrostatic burst cannot be achieved, and appropriate fibers cannot be obtained.

The electrostatic burst is influenced by the viscosity or amount of the solution. When the nonwoven fibers are generated at the collector 84, the optimum applied voltage or the distance between the nozzle 83 and the collector 84 can be adjusted depending on the degree of dryness of the solvent of the solution. When the solvent of the nonwoven fibers generated at the collector 84 is not fully dry but wet, the electrostatic burst is insufficient. Accordingly, the discharge amount from the nozzle 83 should be reduced to achieve an appropriate discharge amount. Further, an increase in the distance between the nozzle 83 and the collector 84 likewise facilitates an occurrence of appropriate electrostatic burst. When the discharge amount cannot be reduced in consideration of achieving high productivity, the distance between the nozzle 83 and the collector 84 may be increased.

The number of pieces of nozzle may be increased for improving productivity. The distance between the nozzles is desirably 10 mm or more. When the distance between the nozzles is short, the adjacent nozzles or the charged PVDF solution 81 are influenced by the charges of each other's. Then, sufficient electrostatic burst cannot be achieved and hence appropriate fibers cannot be obtained.

In the second embodiment, the nozzle 83 is scanned at a constant speed on the collector 84 along a nozzle scanning pattern 833 so that a layer of nonwoven fibers of uniform thickness is obtained. Thus, nonwoven fibers of a prescribed thickness are prepared. The scanning speed is desirably 50 mm/s or less. When the scanning speed is high, the nonwoven fibers accumulated on the collector 84 are deposited under the tensile force attributed to the scanning speed. Therefore, stress is remained, and this may cause the electrolyte membrane 2 to contract. Though a plurality of needle-like nozzles 83 are used in the second embodiment, a block-like nozzle 83 provided with a plurality of discharging holes may be used. This makes it possible to form homogeneous fibers without being influenced by the difference between individual nozzles 83.

Figure 16:
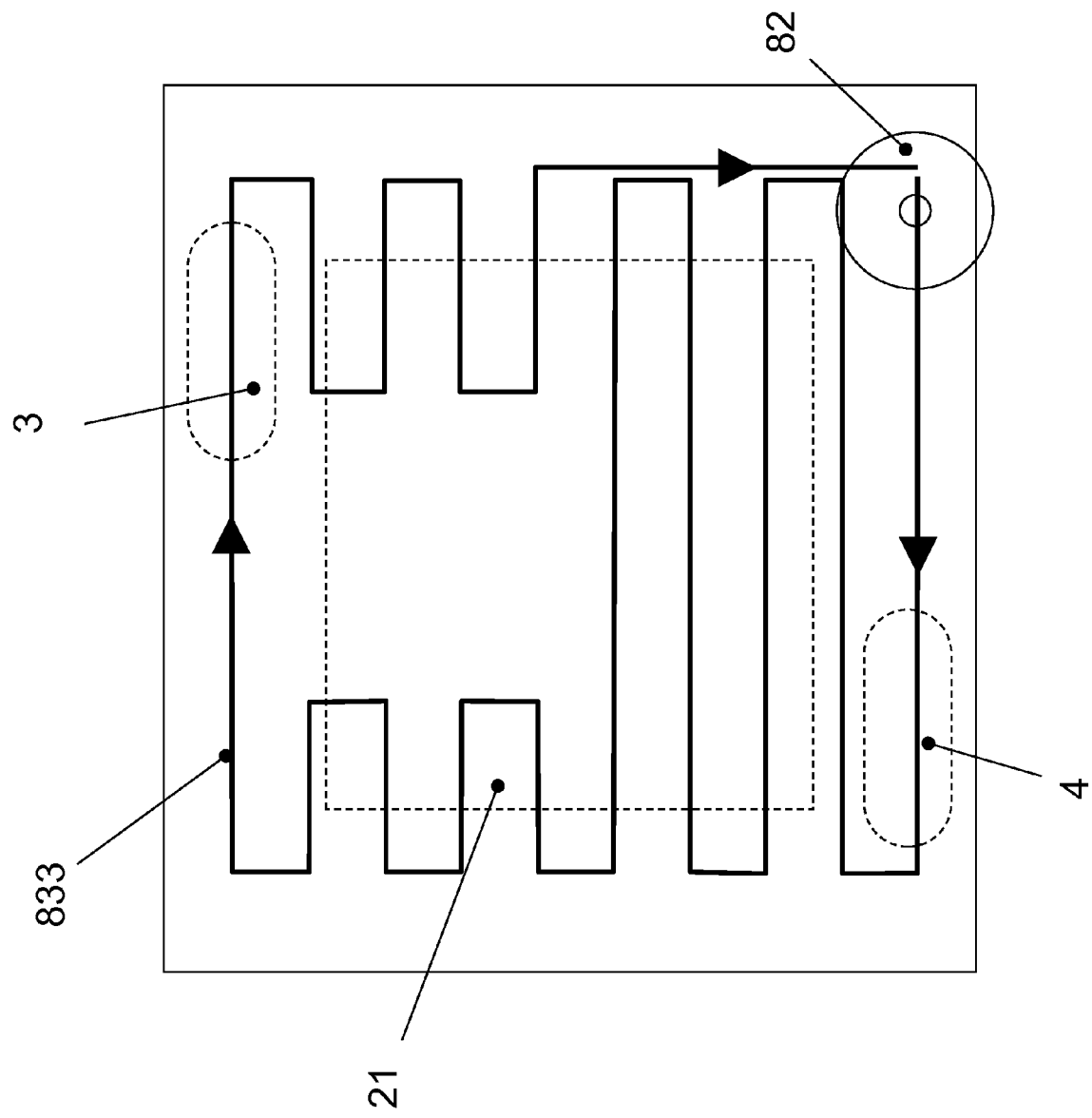
FIG. 16 is a schematic diagram of a nozzle scan track in providing thickness variation in nonwoven fibers according to the second embodiment.

FIG. 16 is a schematic diagram of the nozzle scan track in providing thickness variation to the nonwoven fibers according to the second embodiment.

(a) Firstly, a PET film 85 having its front surface subjected to antistatic treatment is prepared (FIG. 6A).

(b) Next, PVDF nonwoven fibers 86 are accumulated on the PET film 85. In this case, in order to obtain the size required as the electrolyte membrane 2, the nozzle is scanned over a region greater than the region to be used as the electrolyte membrane 2 (FIG. 6B). Thus, on the entire region greater than the region to be used as the electrolyte membrane 2, nonwoven fibers 861 with uniform thickness are prepared. The thickness is equivalent to the thickness of the reinforce membrane 22 at the center portion 221 of the power generating region.

(c) Thereafter, nonwoven fibers 862 are deposited only on the periphery of the sides 31 to 33 of the gasket frame and the region 231 near the fuel gas outlet of the electrolyte membrane 2, to increase the thickness of the nonwoven fibers 862 at the periphery of the sides 31 to 33 of the gasket frame and the region 231 near the fuel gas outlet relative to the center portion 221 of the power generating region 21 (FIG. 6C). Specifically, after the nonwoven fibers 861 with uniform membrane thickness are prepared, the nozzle 83 is scanned as shown by the scanning pattern 833 shown in FIG. 16, so that the nonwoven fibers 862 are deposited only at the periphery of the sides 31 to 33 of the gasket frame and the region corresponding to the region 231 near the fuel gas outlet. Thus, as shown in FIG. 5B, the thickness of the PVDF nonwoven fibers 86 can be made the smallest at the center portion 221 of the power generating region 21. Further, the thickness of the PVDF nonwoven fibers can be made the greatest at the outer circumferential portion of the region, which is greater than the region to be used as the electrolyte membrane 2, and the region to the side 31 of the gasket frame opposing to the side 34 of the gasket frame on the fuel gas outlet 4 side.

Thus, as shown in FIG. 8, the distribution of the nonwoven fibers 86 becomes asymmetric distribution 61 about the center of the thickness of the electrolyte membrane 2.

Note that, similarly to the first embodiment, in the second embodiment also, without being limited to the example shown in FIG. 6, non-uniform mass distribution of the nonwoven fibers in the plane of the electrolyte membrane 2 may be implemented as shown in other example shown in FIGS. 9A to 9D. In the following, the other example is described.

(a) Firstly, a PET film 85 having its front surface subjected to antistatic treatment is prepared (FIG. 9A).

(b) In advance, nonwoven fibers 862 are deposited only on the periphery of the sides 31 to 33 of the gasket frame and the region 231 near the fuel gas outlet (FIG. 9B).

(c) Next, nonwoven fibers 861 are prepared over the entire region greater than the region to be used as the electrolyte membrane 2 (FIG. 9C).

(d) Again, the nonwoven fibers 862 are deposited only on the periphery of the sides 31 to 33 of the gasket frame and the region 231 near the fuel gas outlet (FIG. 9D).

Thus, as shown in FIG. 10, the electrolyte membrane 2 whose mass distribution 62 of the nonwoven fibers per unit area is line symmetric in the thickness direction of the membrane relative to the thickness center portion of the electrolyte membrane 2 can be obtained. As a result, the difference in variations of size of the electrolyte membrane 2 due to expansion and contraction at the front surface and the back surface can be reduced.

Similarly to the first embodiment, the applying process of the electrolyte solution 87 shown in FIG. 11 may be performed also in the second embodiment.

(a) The obtained PVDF nonwoven fibers 86 are impregnated with the electrolyte solution 87. Preferably, the electrolyte solution 87 is a mixture solvent of water and ethanol. Further, in order to impregnate the PVDF nonwoven fibers 86 with the electrolyte solution 87, the proportion of water in the solvent is desirably half or less. When the water proportion in the solvent is high, since PVDF is hydrophobic, the solution may not be appropriately applied in some cases.

(b) Next, using a bar coater (not shown), the electrolyte solution 87 is applied to the nonwoven fibers 86. Note that the applying method of the electrolyte solution 87 is not limited to use of the bar coater. For example, application through use of a die or printing may be employed. Further, it is preferable that the nonwoven fibers 86 with high voidage are impregnated with the electrolyte solution 87 so as to eliminate the voids.

(c) Next, after the electrolyte solution 87 is applied, the solvent is evaporated, to dry the solution.

(d) Further, the electrolyte solution 87 is applied such that the dried electrolyte 2 has a prescribed thickness.

(e) Thereafter, after the applied electrolyte solution 87 has dried, annealing is performed, to crystallize the electrolyte. By crystallizing the electrolyte, durability can be improved. Note that, it is desirable that the annealing temperature is higher than the glass transition temperature of the electrolyte material by 10° C. or more. When the annealing temperature is excessively low, sufficient crystallization cannot be achieved, and durability of the electrolyte membrane 2 cannot be secured. Further, it is desirable that the annealing time is performed for 30 minutes or more and two hours or less. When the annealing time is short, sufficient crystallization cannot be achieved. On the other hand, when the annealing time is long, since crystallization excessively progresses, proton electrical conductivity becomes low.

(f) After annealing, the PET substrate 85 is peeled off, to obtain the electrolyte membrane 2.

Note that, without being limited to the example shown in FIG. 11, the electrolyte solution may be applied as in other example shown in FIGS. 12A to 12E. In the following, a description will be given of the other example. In the other example, the process proceeds similarly to FIG. 11A to FIG. 11F, and then the process following the (f), i.e., peeling, is shown. Accordingly, FIGS. 12A and 12B are substantially identical to FIGS. 11A and 11B.

(g) The membrane, which is the nonwoven fibers 86 including one surface to which the electrolyte solution 87 has been applied, is peeled off from the PET substrate (FIG. 12C).

(h) After the membrane being the nonwoven fibers 86 including one surface to which the electrolyte solution 87 has been applied is peeled off, the surface having originally been on the PET substrate 85 side is placed face up (FIG. 12D).

(i) The electrolyte solution 87 is applied again to the surface having originally been on the PET substrate 85 side (FIG. 12E).

Thus, it becomes possible to dispose the PVDF nonwoven fibers 86 at the center portion in the thickness direction of the electrolyte membrane 2. Accordingly, it becomes possible to reduce the difference in variations of size of the electrolyte membrane 2 at the front surface and the back surface when the electrolyte membrane 2 expands and contracts.

Further, the electrolyte solution may be applied as shown in other example shown in FIGS. 13A to 13C. In the following, a description will be given of the other example.

(a) In advance, an electrolyte solution 87 is applied to a PET substrate 85 (FIG. 13A).

(b) PVDF nonwoven fibers 86 are formed on the electrolyte solution 87 by electrospinning (FIG. 13B).

(c) Thereafter, the electrolyte solution 87 is applied such that the voids of the PVDF nonwoven fibers are packed with the electrolyte solution 87 (FIG. 13C).

Thus, it becomes possible to dispose the PVDF nonwoven fibers 86 at the center portion in the thickness direction of the electrolyte membrane 2 without peeling off the electrolyte membrane 2 from the PET substrate 85. Accordingly, the process can be simplified.

Further, after the electrolyte solution 87 is applied to the PET substrate 85, the PVDF nonwoven fibers 86 may be formed thereon. Alternatively, the PVDF nonwoven fibers 86 may be formed on the electrolyte solution 87 not being dried. In the latter case, when the PVDF nonwoven fibers 86 are formed on the electrolyte solution 87 not being dried, the formed PVDF nonwoven fibers 86 sink into the electrolyte solution 87 having been applied in advance. Therefore, the PVDF nonwoven fibers 86 exist across the electrolyte solution 87 having been applied in advance to the PET substrate 85 and the electrolyte solution 87 applied after the PVDF nonwoven fibers 86 are formed. As a result, the interface between the electrolyte solution 87 applied in advance and the electrolyte solution 87 applied after the PVDF nonwoven fibers 86 are formed is reinforced by the PVDF nonwoven fibers 86. Thus, it becomes possible to suppress the disadvantageous peeling that occurs at the interface between the electrolyte solution 87 having been applied in advance and the electrolyte solution 87 formed after the PVDF nonwoven fibers 86 are formed.

In the second embodiment, by controlling the overlaying time, the scanning speed or the scanning method of the nozzle, the mass of the nonwoven fibers per unit area is controlled. Note that, in addition to the foregoing, it is also possible to narrower the fiber diameter of the nonwoven fibers such that PVDF is highly densely overlaid one another. In this case, it becomes possible to change the mass of the nonwoven fibers per unit area while maintaining the maximum thickness of the nonwoven fibers to be small. Thus, the present invention is also applicable to the electrolyte membrane with small thickness.

Further, a reduction in the fiber diameter of each of the nonwoven fibers can be realized by the process conditions such as: reducing the solution concentration; reducing the nozzle diameter; reducing the solution delivery pressure; increasing the applied voltage; increasing the spinning distance, and the like.

Note that, though the second embodiment is applied to the membrane electrode assembly having the serpentine-like fuel gas flow channel in the separator, it is also applicable to a membrane electrode assembly having a straight fuel gas flow channel.

Example 1

<Preparation of Nonwoven Fiber Material>

The pellet-form PVDF (available from Arkema, molecular weight 275000) was dissolved in DMAc. As the specific condition, 80 g of DMAc was mixed with 20 g of PVDF and agitated by a planetary mixer, to dissolve PVDF in DMAc.

<Preparation of Nonwoven Fibers>

A nonwoven fiber manufacturing apparatus (available from Panasonic Factory Solutions Co., Ltd.) used for electrospinning was prepared. Further, in connection with the nonwoven fiber manufacturing apparatus, a stainless steel-made nozzle of 24 G (inner diameter 0.31 mm, outer diameter 0.57 mm, needle length 15 mm) was attached to the tip of a disposable syringe having a capacity of 10 mL. Under the condition in which: the distance from the collector to the nozzle was 120 mm; the applied voltage between the collector and the nozzle was 20 kV; and the solution delivery pressure was 30 kPa, nonwoven fibers were prepared. The diameter of each of the nonwoven fibers generated on the collector had a distribution of 400 nm to 1100 nm, and the average fiber diameter was 700 nm. Further, the voidage of nonwoven fibers was approximately 90%.

(a) In order to improve productivity, five disposable syringes each measuring 10 mL were juxtaposed to one another. Five nozzles each measuring 15 mm were linearly disposed.

(b) By scanning the nozzles at the speed of 5 mm/s for a plurality of times in a prescribed pattern, nonwoven fibers of uniform membrane thickness were obtained. The nonwoven fibers of 300 mm square were prepared. The mass per unit area was 0.26 mg/cm$^2$ and the thickness of the nonwoven fibers was 3 μm.

(c) Thereafter, nonwoven fibers were further prepared by 80 mm width from the external circumference of the region of 300 mm square, and by 100 mm width from the external circumference of the side corresponding to the fuel gas inlet when the nonwoven fibers are fixed to the frame element as the electrolyte membrane, with the mass per unit area being 1.28 mg/cm$^2$ and the thickness of the nonwoven fibers being 25 μm.

<Method for Forming Electrolyte Membrane>

Nafion solution (SE-20092, available from DuPont) was used as the electrolyte solution. Using a bar coater, the nonwoven fibers were impregnated with the electrolyte solution. Impregnation was carried out with the electrolyte solution of an appropriate volume, such that a membrane having a thickness of 30 μm was obtained, through drying and calcining following the impregnation. The drying and calcining were carried out for one hour at 120° C.

The electrolyte membrane 2 prepared through the present invention had the power generating region 21 of 160 mm square, and the thickness of the electrolyte membrane 2 was 30 μm. In the first embodiment, the region 211 near the fuel gas inlet extends by 48 mm from the side 31 of the gasket frame provided with the fuel gas inlet 3, and the peripheral region 212 of the gasket frame extends by 16 mm from the sides 32 to 34 of the gasket frame not provided with the fuel gas inlet 3. The resultant mass of the reinforce membrane 22 per unit area disposed in the electrolyte membrane 2 was 1.28 mg/cm$^2$, and the resultant thickness of the reinforce membrane was 25 μm in the region 211 near the fuel gas inlet and the peripheral region 212 of the gasket frame. Further, at the center portion 221 of the power generating region, the resultant mass of the reinforce membrane 22 per unit area arranged in the electrolyte membrane 2 was 0.26 mg/cm$^2$ and the resultant thickness of the reinforce membrane was 3 μm.

Example 2

<Preparation of Nonwoven Fibers>

A nonwoven fiber manufacturing apparatus (available from Panasonic Factory Solutions Co., Ltd.) used for electrospinning was prepared. A stainless steel-made nozzle of 24 G (inner diameter 0.31 mm, outer diameter 0.57 mm, needle length 15 mm) was attached to the tip of a disposable syringe having a capacity of 10 mL. Under the condition in which: the distance from the collector to the nozzle was 120 mm; the applied voltage between the collector and the nozzle was 20 kV; and the solution delivery pressure was 30 kPa, nonwoven fibers were prepared. The diameter of each of the nonwoven fibers generated on the collector had a distribution of 400 nm to 1100 nm, and the average fiber diameter was 700 nm. Further, the voidage of the nonwoven fibers was approximately 90%.

(a) In order to improve productivity, five disposable syringes each measuring 10 mL were juxtaposed to one another. Five nozzles each measuring 15 mm were linearly disposed.

(b) By scanning the nozzles at the speed of 5 mm/s for a plurality of times in a prescribed pattern, nonwoven fibers of uniform membrane thickness were obtained. The nonwoven fibers of 300 mm square were prepared. The resultant mass per unit area was 0.26 mg/cm$^2$ and the resultant thickness of the nonwoven fibers was 3 μm.

(c) Thereafter, nonwoven fibers were further prepared by 80 mm width from the external circumference of the region of 300 mm square, and by 100 mm width from the external circumference from the side corresponding to the fuel gas outlet when the nonwoven fibers are fixed to the frame element as the electrolyte membrane, with the mass per unit area being 1.28 mg/cm$^2$ and the thickness of nonwoven fibers being 25 μm.

(Third Embodiment)

Figure 19:
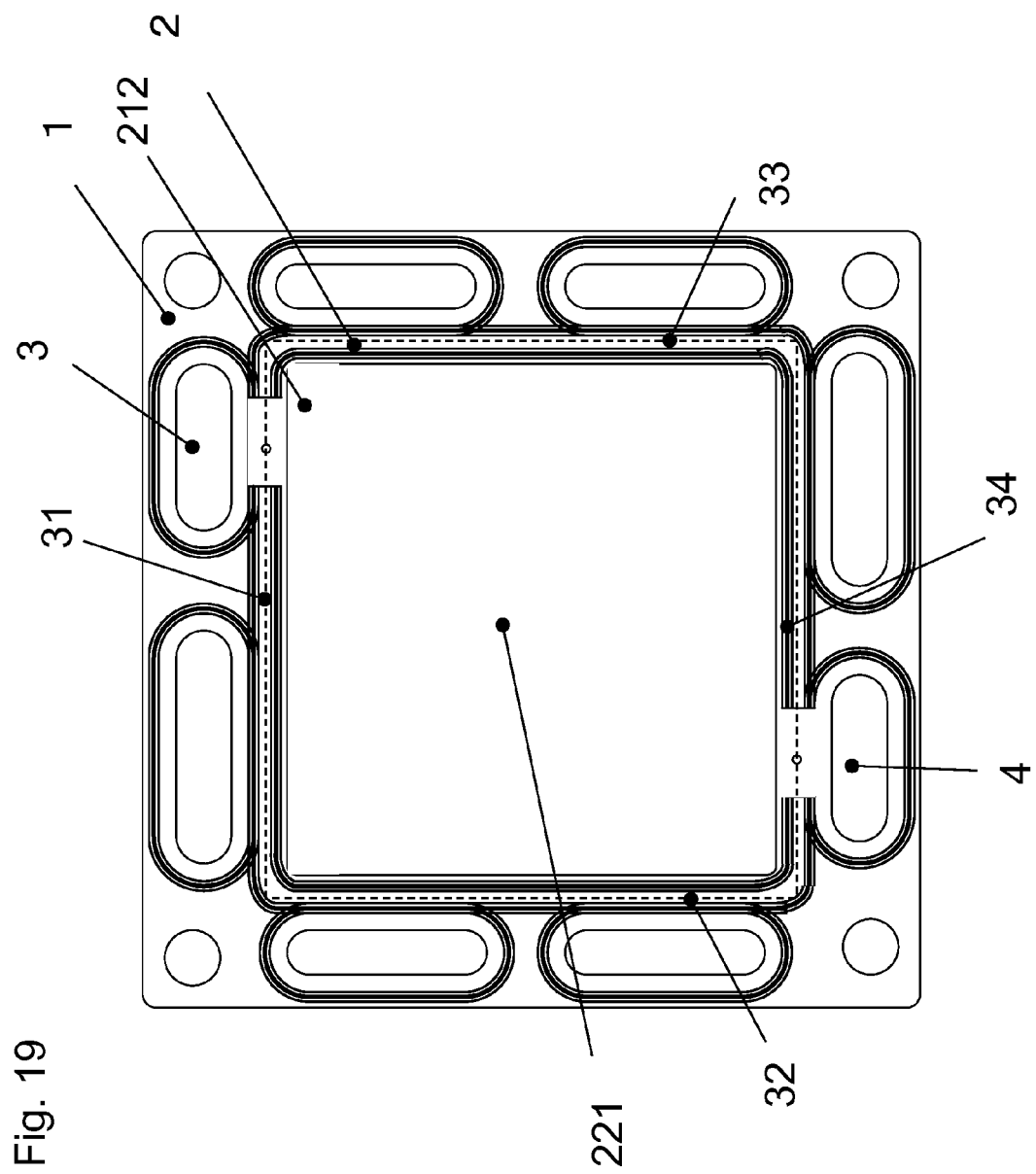
FIG. 19 is a schematic diagram of a membrane integrated frame element using an electrolyte membrane according to a third embodiment.

FIG. 19 is a schematic diagram of a membrane integrated frame element 1 using an electrolyte membrane 2 for solid polymer fuel cell according to a third embodiment of the present invention.

As compared to the electrolyte membrane of the first embodiment, the electrolyte membrane 2 according to the third embodiment is identical in that the nonwoven fibers have non-uniform mass distribution in the plane of the electrolyte membrane 2. On the other hand, the electrolyte membrane 2 according to the third embodiment is particularly characterized in that the mass of the nonwoven fibers per unit area in a region 212 being a partial region of the peripheral portion of a side 31 of the gasket frame near the fuel gas inlet is greater than the mass of the nonwoven fibers per unit area in a region 221 corresponding to the center portion of the gasket frame. Note that the region 212 corresponds to the width of 10% of the length from the side 31 of the gasket frame to the opposing side 34 of the gasket frame.

The electrolyte membrane 2 according to the third embodiment has a reinforce membrane 22 including PVDF nonwoven fibers, which function as a whole as the reinforce member, with non-uniform mass distribution. Further, with the electrolyte membrane 2, at the partial region 212 of the peripheral portion of the side 31 of the gasket frame of the gas inlet periphery where expansion and contraction frequently take place, particularly the mass of PVDF nonwoven fibers per unit area is greater than the mass of nonwoven fibers per unit area in the region 221 corresponding to the center portion of the gasket frame. Since the PVDF nonwoven fibers function as the reinforce member of the electrolyte membrane 2, expansion incurred by impregnation of water can be restricted. Thus, deterioration of the membrane can be suppressed.

(Fourth Embodiment)

Figure 20:
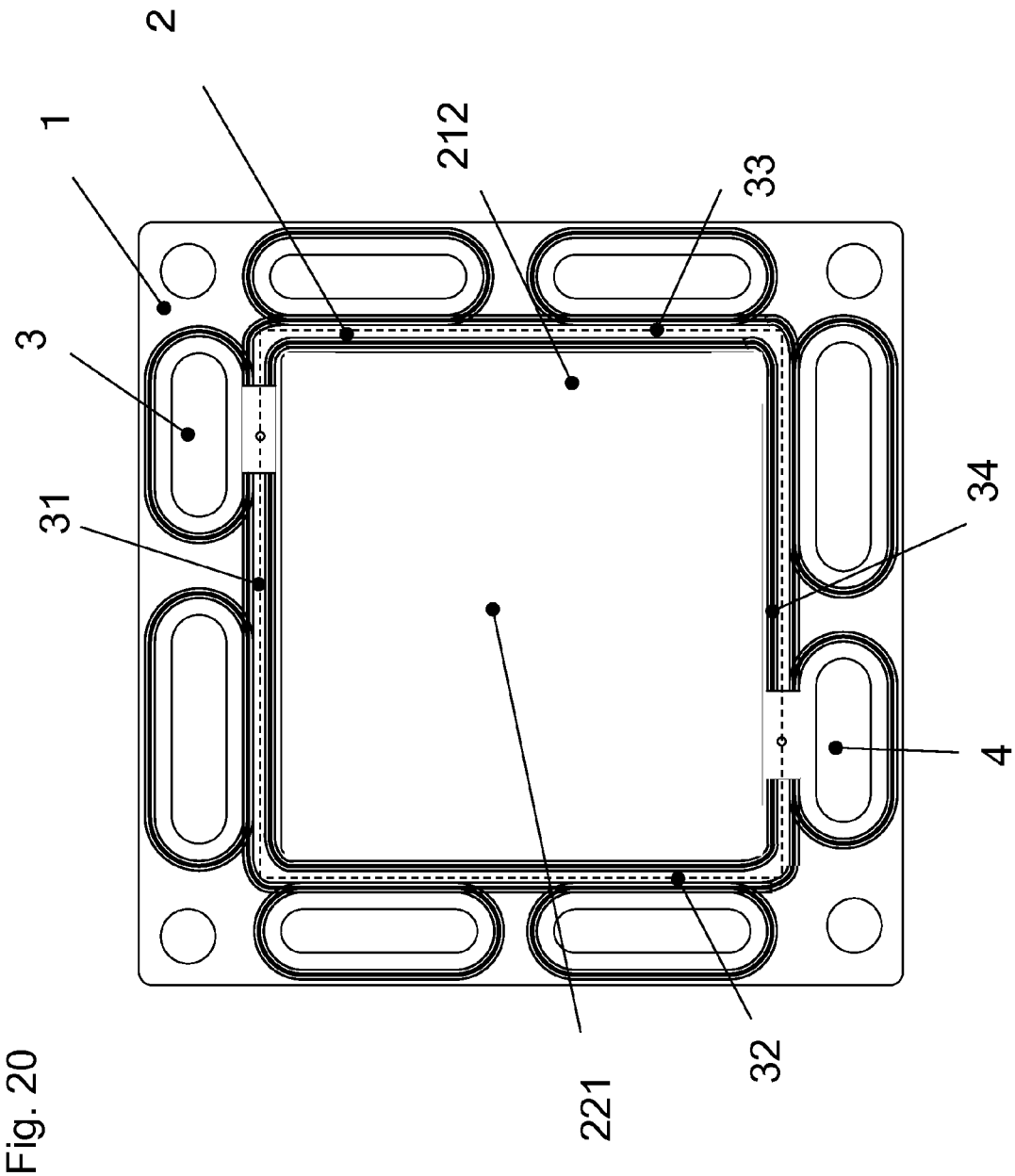
FIG. 20 is a schematic diagram of a membrane integrated frame element using an electrolyte membrane according to a fourth embodiment.

FIG. 20 is a schematic diagram of a membrane integrated frame element 1 using an electrolyte membrane 2 for solid polymer fuel cell according to a fourth embodiment of the present invention.

As compared to the electrolyte membrane according to the first embodiment, the electrolyte membrane 2 according to the fourth embodiment is identical in that the nonwoven fibers have non-uniform mass distribution in the plane of the electrolyte membrane 2. Further, the electrolyte membrane 2 according to the fourth embodiment is characterized in that the mass of the nonwoven fibers per unit area in an outer circumferential portion 212 of a side 31 of the gasket frame is greater than the mass of the nonwoven fibers per unit area of a region 221 corresponding to the center portion of the gasket frame. Note that the outer circumferential portion 212 corresponds to the width corresponding to 10% of the length from a side 31 of the gasket frame to the opposing side 34 of the gasket frame, and to 10% of the width of the length from a side 32 of the gasket frame to the opposing side 33 of the gasket frame.

The electrolyte membrane 2 according to the fourth embodiment has a reinforce membrane 22 containing the PVDF nonwoven fibers functioning, as a whole, as a reinforce member of non-uniform mass distribution. Further, with the electrolyte membrane 2, at the outer circumferential portion 212 of the side 31 of the gasket frame where expansion and contraction frequently take place, particularly the mass of the PVDF nonwoven fibers per unit area is greater than the mass of the nonwoven fibers per unit area in the region 221 corresponding to the center portion of the gasket frame. Since the PVDF nonwoven fibers function as the reinforce member of the electrolyte membrane 2, expansion caused by impregnation of water can be restricted. Thus, deterioration of the membrane can be suppressed.

(Fifth Embodiment)

Figure 21:
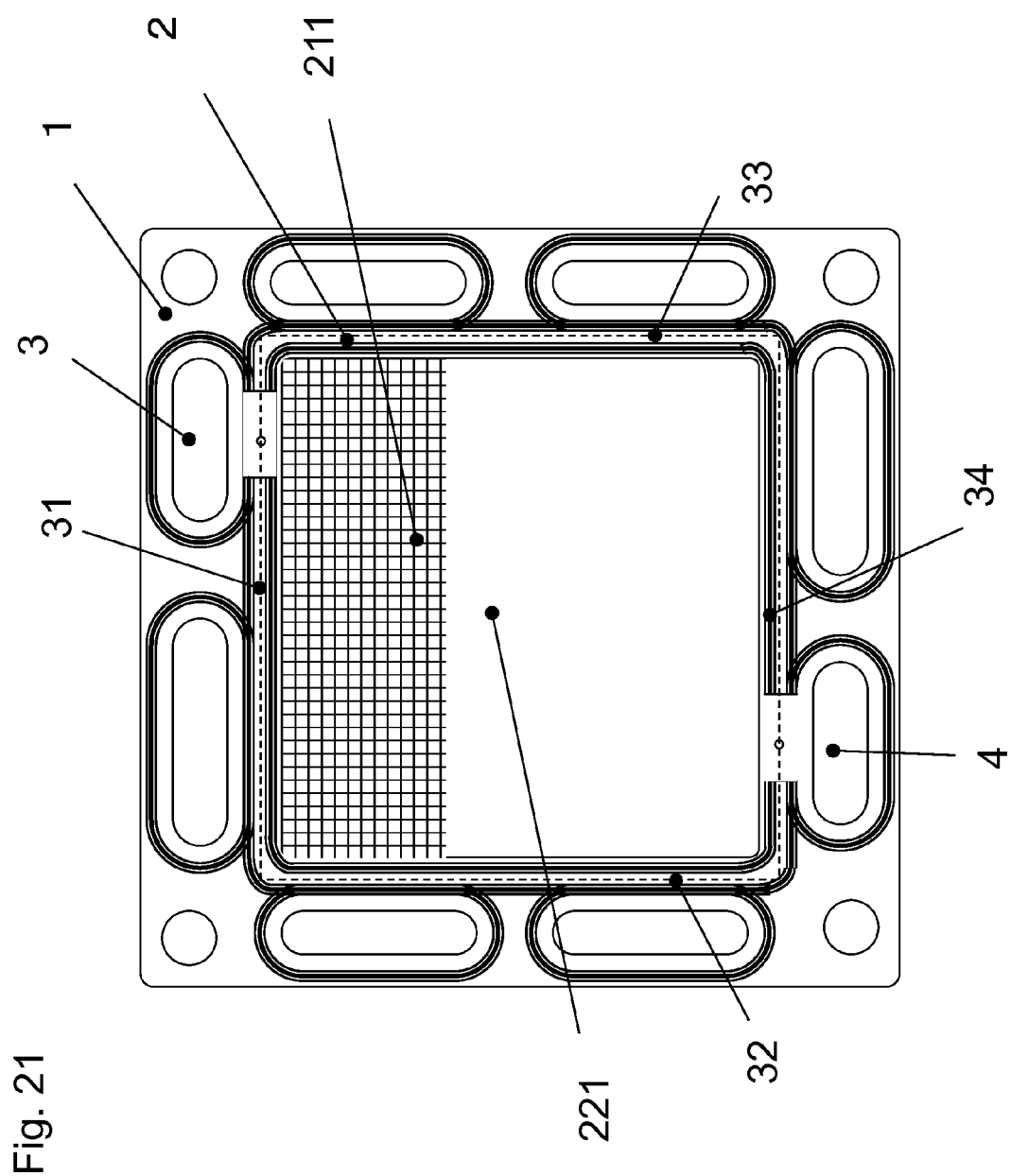
FIG. 21 is a schematic diagram of a membrane integrated frame element using an electrolyte membrane according to a fifth embodiment.

FIG. 21 is a schematic diagram of a membrane integrated frame element 1 using an electrolyte membrane 2 for solid polymer fuel cell according to a fifth embodiment of the present invention.

As compared to the electrolyte membrane according to the first embodiment, the electrolyte membrane 2 according to the fifth embodiment is identical in that the nonwoven fibers have non-uniform mass distribution in the plane of the electrolyte membrane 2. Further, the electrolyte membrane 2 according to the fifth embodiment is characterized in that the mass of the nonwoven fibers per unit area in a gas inlet periphery 211 near the fuel gas inlet is greater than the mass of the nonwoven fibers per unit area in a region 221 corresponding to the center portion of the gasket frame. Note that the region of the fuel gas inlet periphery 211 corresponds to the width corresponding to 30% of the length from a side 31 of the gasket frame to the opposing side 34 of the gasket frame.

The electrolyte membrane 2 according to the fifth embodiment has a reinforce membrane 22 containing the PVDF nonwoven fibers functioning, as a whole, as a reinforce member of non-uniform mass distribution. Further, with the electrolyte membrane 2, at the gas inlet periphery 211 near the fuel gas inlet where expansion and contraction frequently take place, particularly the mass of the PVDF nonwoven fibers per unit area is greater than the mass of the nonwoven fibers per unit area in the region 221 corresponding to the center portion of the gasket frame. Since the PVDF nonwoven fibers function as the reinforce member of the electrolyte membrane 2, expansion caused by impregnation of water can be restricted. Thus, deterioration of the membrane can be suppressed.

(Sixth Embodiment)

Figure 22:
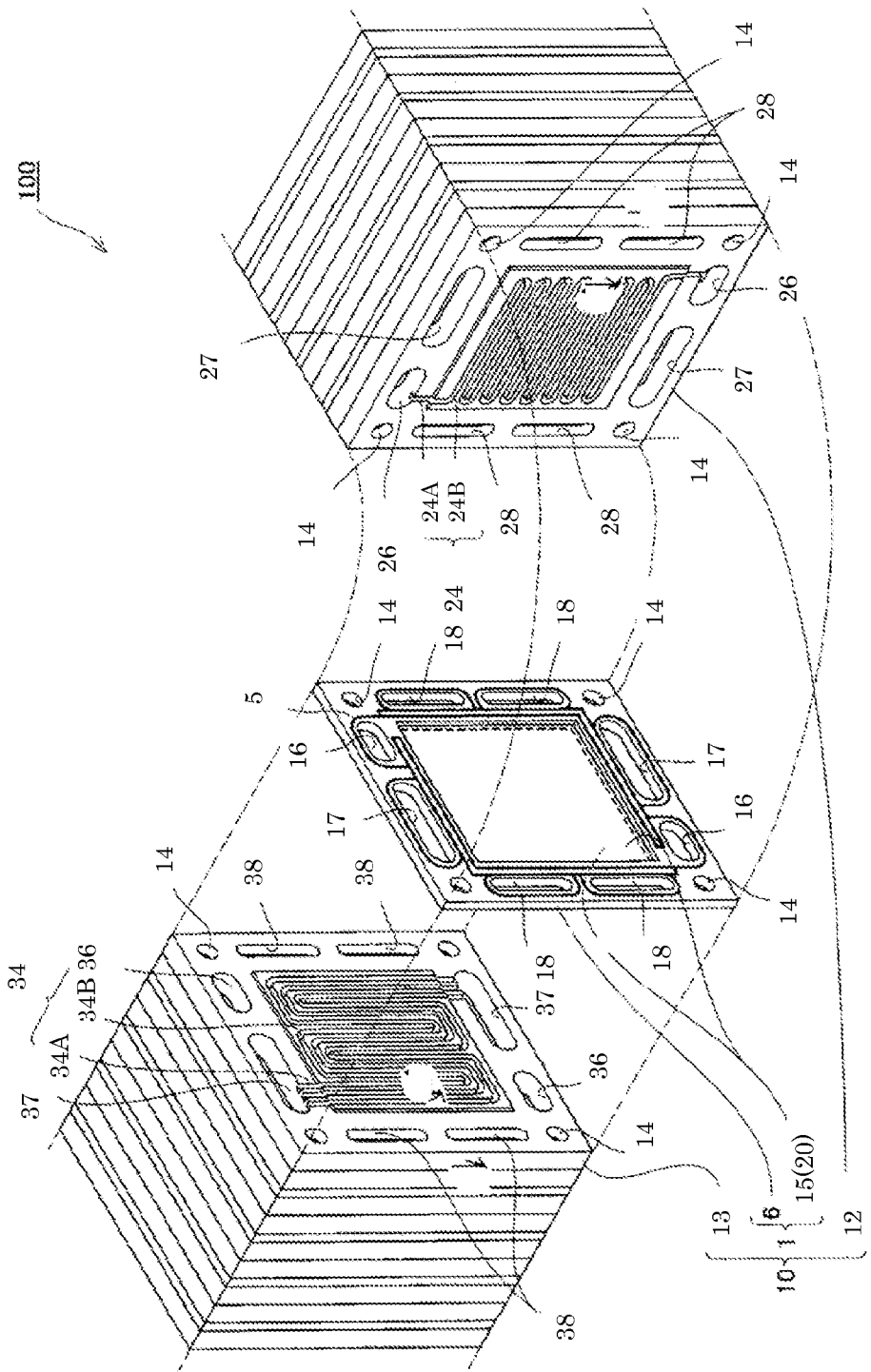
FIG. 22 is a partially exploded perspective view showing the schematic structure of a solid polymer fuel cell according to a sixth embodiment using the electrolyte membrane according to the first to fifth embodiments.

FIG. 22 is a perspective view schematically showing, in a partially exploded manner, the structure of a solid polymer fuel cell 100 according to a sixth embodiment using the electrolyte membrane 2 for solid polymer fuel cell according to the first to fifth embodiments of the present invention.

As shown in FIG. 22, the solid polymer fuel cell 100 is structured with a plurality of cells (electric cell modules) 10 being stacked. Note that, though it is not shown, to each of the outermost layers on the opposite sides of the cell 10, a current collector, an insulating plate, and an end plate (termination plate) are attached. Thus, the cell 10 is fastened by fastening bolts and nuts (both not shown) that are inserted into bolt holes 14 from the opposite ends. In the present embodiment, 60 pieces of the cells 10 are stacked, and the bolts and the nuts inserted into the bolt holes 14 are fastened under a fastening force of 10 kN. Note that, in the present embodiment, though the description will be given of the structure in which a plurality of cells 10 are stacked, the present invention is applicable to the case where the solid polymer fuel cell is structured with a single cell.

The cell 10 is made of an anode separator 12 and a cathode separator 13 being a pair of electrical conductivity separators, between which a membrane-frame assembly 1 is interposed. More specifically, the cell 10 is structured as follows: the opposite surfaces of a frame element 6 disposed at the peripheral portion of the membrane-frame assembly 1 are clamped by the pair of separators 12 and 13 via gaskets 5, which are exemplary sealing members disposed at the opposite surfaces of the frame element 6. Thus, diffusion layers 15 provided at the outermost sides of the electrode layer of the membrane electrode assembly 20 abut on the front surfaces of the separators 12 and 13. Further, a fuel gas flow channel and an oxidizing gas flow channel are defined by a diffusion layer abutting portion 24A of a fuel gas flow channel groove 21 of the anode separator 12, a diffusion layer abutting portion 34A of the oxidizing gas flow channel groove 34 of the cathode separator 13, and a diffusion layer 15. Thus, the fuel gas flowing through the diffusion layer abutting portion 24A is brought into contact with the diffusion layer 15 on the anode separator 12 side, to cause an electrochemical reaction of the solid polymer fuel cell 100. Further, in the stacked cells 10, the adjacent membrane electrode assemblies 20 are electrically connected in series or in parallel to each other.

The peripheral portion of the separators 12 and 13 and the membrane-frame assembly 1, i.e., the frame element 6, is provided with a pair of through holes through which the fuel gas and the oxidizing gas flow, i.e., fuel gas manifold holes 16, 26, and 36 and the oxidizing gas manifold holes 17, 27, and 37. In the state where the cells 10 are stacked, the through holes accumulate to form the fuel gas manifold and the oxidizing gas manifold.

Further, a fuel gas flow channel groove 24 is provided at the main surface on the inner side of the anode separator 12, so as to connect between a pair of fuel gas manifold holes 26 and 26. An oxidizing gas flow channel groove 34 is formed at the main surface on the inner side of the cathode separator 13, so as to connect between a pair of oxidizing gas manifold holes 37 and 37. That is, the oxidizing gas and the fuel gas branch from their respective one manifolds, i.e., the manifolds on the supply side, to the flow channel grooves 24 and 34, and to flow into their respective other manifolds, i.e., the manifolds on the discharge side. Further, the fuel gas flow channel groove 24 has, in the state where the cell 10 is assembled, a diffusion layer abutting portion 24A formed on the front surface abutting on the diffusion layer 15 and a pair of communication portions (communication-purpose grooves) 24B formed across the front surface abutting on the diffusion layer 15 and the front surface opposing to the periphery of the diffusion layer 15. In a similar manner, the flow channel groove 34 has, in the state where the cell 10 is assembled, the diffusion layer abutting portion 34A formed on the front surface abutting on the diffusion layer 15 and a pair of communication portions (communication-purpose grooves) 34B formed across the front surface abutting on the diffusion layer 15 and the front surface opposing to the periphery of the diffusion layer 15. Here, the communication portions 24B and 34B are formed to couple a pair of manifold holes 26 and 37 and the diffusion layer abutting portions 24A and 34A, respectively. Thus, the oxidizing gas and the fuel gas branch from the fuel gas manifold hole 26 and the oxidizing gas manifold hole 37 on the supply side, to flow into the communication portions 24B and 34B, respectively. The oxidizing gas and the fuel gas are brought into contact with the diffusion layer 15 at the diffusion layer abutting portions 24A and 34A, respectively, to cause an electrochemical reaction. Then, the surplus gas and the reactive generation component are discharged to the fuel gas manifold hole 26 and the oxidizing gas manifold hole 37 on the discharge side via the communication portions 24B and 34B connected to the fuel gas manifold hole 26 and the oxidizing gas manifold hole 37 on the discharge side, respectively.

The gaskets 5 are arranged on the opposite main surfaces of the frame element 6 of the membrane electrode assembly 1. The gaskets 5 are arranged such that the oxidizing gas and the fuel gas do not flow from the prescribed flow channel grooves 24 and 34. That is, the gaskets 7 are arranged to surround the periphery of the manifold holes 16, 17, and 18 and the periphery of the frame. Further, in this case, in the state where the cell 10 is assembled, the gasket 5 is not arranged on the anode separator 12 side at the position on which the communication portion 24B of the fuel gas flow channel groove 24 abuts. Further, the gasket 5 is arranged such that the fuel gas manifold hole 16 and the membrane electrode assembly 20 are integrally surrounded. Similarly, in the state where the cell 10 is assembled, the gasket 5 is not arranged on the cathode separator 13 side at the position on which the communication portion 34B of the oxidizing gas flow channel groove 34 abuts. Further, the gaskets 5 prevent leakage of the fuel gas and the oxidizing gas to the outside of the fuel gas flow channel 24 and the oxidizing gas flow channel 34, such that the flow of the fuel gas flowing between the oxidizing gas manifold hole 17 and the membrane electrode assembly 20 is not inhibited, and the flow of the oxidizing gas flowing between the oxidizing gas manifold hole 37 and the membrane electrode assembly 20 is not inhibited. Note that, in FIG. 22, for sake of convenience, the gaskets 5 and the serpentine structure of the flow channel grooves 24 and 34 of the diffusion layer abutting portions 24A and 34A of the separators 12 and 13 are shown schematically.

Note that, with the solid polymer fuel cell 100 according to the present embodiment, a description has been given of the case where the manifolds are formed by the through holes of the separators 12 and 13. Alternatively, it is also possible to employ so-called external manifolds, that is, manifolds formed externally to the separators 12 and 13. That is, the membrane-frame assembly 1 and the separators 12 and 13 are not provided with the fuel gas manifold holes 16, 26, and 36 and the oxidizing gas manifold holes 17, 27, and 37, and the fuel gas flow channel groove 24 and the communication portions 24B and 34B of the oxidizing gas flow channel 34 extend to end faces of the separators 12 and 13, respectively. Then, pipes respectively supplying the fuel gas and the oxidizing gas are branched and joined to the end faces of the separators 12 and 13, respectively. In the case where the external manifolds are employed, the gaskets 5 are arranged to extend to the end face of the frame element 6 along the respective peripheries of the communication portions 24B and 34B of the fuel gas flow channel groove 24 and the oxidizing gas flow channel groove 34. Note that, from the viewpoint of achieving a reduction in size of the solid polymer fuel cell 100 and a simplified appearance, it is preferable that the manifolds are formed by the through holes of the separators.

Further, similarly to the fuel gas manifold holes 16, 26, and 36 and the oxidizing gas manifold holes 17, 27, and 37, water gas manifold holes 18, 28, and 38 forming two pairs of manifolds, through which water flows, are provided at the peripheral portion of the separators 12 and 13 of the membrane-frame assembly 1. Thus, in the state where the cells 10 are stacked, the manifold holes are connected to one another to form the two pairs of water manifolds.

According to the present invention, nonwoven fibers used for reinforcement can be efficiently produced. Despite its small thickness, the electrolyte membrane with high mechanical strength, excellent size stability when impregnated with water, and low resistance can be obtained. The membrane electrode assembly obtained using this electrolyte membrane provides a solid polymer fuel cell with high electrical performance and high durability.

DESCRIPTION OF REFERENCE SIGNS 1 membrane integrated frame element
2 electrolyte membrane
10 cell
12 anode separator
13 cathode separator
14 bolt hole
15 diffusion layer
16, 26, 36 fuel gas manifold hole
17, 27, 37 oxidizing gas manifold hole
18, 28, 38 water gas manifold hole
24 fuel gas flow channel groove
34 oxidizing gas flow channel groove
24A, 34A diffusion layer abutting portion
24B, 34B communication portion (communication-purpose groove)
20 membrane electrode assembly
21 power generating region
211 gas inlet peripheral portion
212 gasket peripheral portion (outer circumferential portion)
221 center portion of power generating region (center portion of gasket frame)
231 gas outlet peripheral portion
22 reinforce membrane
3 fuel gas inlet
31 side of gasket frame having gas inlet
32 side of gasket frame
33 side of gasket frame
34 side of gasket frame having gas outlet
4 fuel gas outlet
5 gasket
51 gasket fixed boundary portion
6 frame element
61 mass distribution of nonwoven fibers per unit area
62 nonwoven fiber thickness distribution
63 nonwoven fiber amount distribution
8 nonwoven fiber production facility
81 PVDF solution
82 syringe
83 nozzle
831 nozzle scanning pattern in preparing membrane of uniform thickness
832, 833 nozzle scanning pattern in preparing membrane of non-uniform thickness
84 collector
85 PET substrate 86 nonwoven fibers
861 nonwoven fibers of uniform membrane thickness
862 nonwoven fibers of non-uniform membrane thickness
87 electrolyte solution
100 solid polymer fuel cell

The invention claimed is:

1. An electrolyte membrane for a solid polymer fuel cell, comprising:
   a reinforce membrane made of nonwoven fibers; and
   an electrolyte provided in a space among the nonwoven fibers,
   characterized in that the electrolyte membrane has a power generating region and a gasket frame region, the gasket frame region provided on an outer circumference of the power generating region, the nonwoven fibers having a mass per unit area continuously varying as a whole from the power generating region to the gasket frame region,
   in that the nonwoven fibers have a non-uniform mass distribution in a plane of the electrolyte membrane, the mass of the nonwoven fibers per unity area ranging from $0.1 mg/cm^2$ to $1.5 mg/cm^2$, and
   in that the nonwoven fibers have a mass per unit area in a region corresponding to the gasket frame region and a region corresponding to at least part of a peripheral portion of the region corresponding to the gasket frame region which is greater than a mass per unit area in a region corresponding to a center portion of the power generating region,
   wherein a mass per unit area of the nonwoven fibers of the power generating region increases from the region corresponding to the center portion of the power generating region to the outer circumference of the power generating region, and
   wherein the nonwoven fibers have a mass per unit area in a region having a width corresponding to 10% of a length of a side of the power generating region from the gasket frame region which is greater than the mass per unit area in the region corresponding to the center portion of the power generating region.

2. An electrolyte membrane for a solid polymer fuel cell, comprising:
   a reinforce membrane made of nonwoven fibers; and
   an electrolyte provided in a space among the nonwoven fibers,
   characterized in that the electrolyte membrane has a power generating region and a gasket frame region, the gasket frame region provided on an outer circumference of the power generating region, the nonwoven fibers having a mass per unit area continuously varying as a whole from the power generating region to the gasket frame region,
   in that the nonwoven fibers have a non-uniform mass distribution in a plane of the electrolyte membrane, the mass of the nonwoven fibers per unity area ranging from $0.1 mg/cm^2$ to $1.5 mg/cm^2$, and
   in that the nonwoven fibers have a mass per unit area in a region corresponding to the gasket frame region and a region corresponding to at least part of a peripheral portion of the region corresponding to the gasket frame region which is greater than a mass per unit area in a region corresponding to a center portion of the power generating region,
   wherein the nonwoven fibers have a mass per unit area in a region corresponding to a fuel gas inlet of the solid polymer fuel cell to which the electrolyte membrane is adaptable, the mass per unit area in the region corresponding to the fuel gas inlet of the solid polymer fuel cell being greater than the mass per unit area in the region corresponding to the center portion of the power generating region, and
   wherein the nonwoven fibers have a mass per unit area in a region having a width corresponding to 30% of a length of a side of the power generating region provided with the fuel gas inlet of the solid polymer fuel cell to which the electrolyte membrane is adaptable, the mass per unit area in the region having the width corresponding to 30% of the length of the side of the power generating region being greater than the mass per unit area in the region corresponding to the center portion of the power generating region.

3. An electrolyte membrane for a solid polymer fuel cell, comprising:
   a reinforce membrane made of nonwoven fibers; and
   an electrolyte provided in a space among the nonwoven fibers,
   characterized in that the electrolyte membrane has a power generating region and a gasket frame region, the gasket frame region provided on an outer circumference of the power generating region, the nonwoven fibers having a mass per unit area continuously varying as a whole from the power generating region to the gasket frame region,
   in that the nonwoven fibers have a non-uniform mass distribution in a plane of the electrolyte membrane, the mass of the nonwoven fibers per unity area ranging from $0.1 mg/cm^2$ to $1.5 mg/cm^2$, and
   in that the nonwoven fibers have a mass per unit area in a region corresponding to the gasket frame region and a region corresponding to at least part of a peripheral portion of the region corresponding to the gasket frame region which is greater than a mass per unit area in a region corresponding to a center portion of the power generating region,
   wherein the nonwoven fibers have a mass per unit area in a region corresponding to a fuel gas outlet of the solid polymer fuel cell to which the electrolyte membrane is adaptable, the mass per unit area in the region corresponding to the fuel gas outlet of the solid polymer fuel cell being greater than the mass per unit area in the region corresponding to the center portion of the power generating region, and
   wherein the nonwoven fibers have a mass per unit area in a region having a width corresponding to 30% of a length of a side of the power generating region provided with the fuel gas outlet of the solid polymer fuel cell to which the electrolyte membrane is adaptable, the mass per unit in the region having the width corresponding to 30% of the length of the side of the power generating region area being greater than the mass per unit area in the region corresponding to the center portion of the power generating region.

4. The electrolyte membrane for the solid polymer fuel cell according to claim 1,
   wherein the mass per unit area in the region corresponding to the gasket frame region and the region corresponding to the at least part of the peripheral portion of the region corresponding to the gasket frame region is greater than and smaller than 15 times as great as the mass per unit area in the region corresponding to the center portion of the power generating region.

5. The electrolyte membrane for the solid polymer fuel cell according to claim 1,
   wherein the reinforce membrane has a thickness in the region corresponding to the gasket frame region and the region corresponding to the at least part of the peripheral portion of the region corresponding to the gasket frame region which is greater than and 15 times or less of a thickness in the region corresponding to the center portion of the power generating region.

6. The electrolyte membrane for the solid polymer fuel cell according to claim 1,
wherein the nonwoven fibers have a fiber diameter in the region corresponding to the gasket frame region and the region corresponding to the at least part of the peripheral portion of the region corresponding to the gasket frame region which is greater than and 15 times or less of a fiber diameter in the region corresponding to the center portion of the power generating region.

7. The electrolyte membrane for the solid polymer fuel cell according to claim 1,
wherein the nonwoven fibers are prepared through electrospinning.

8. The electrolyte membrane for the solid polymer fuel cell according to claim 1,
wherein the electrolyte membrane is a proton conductive ion exchange membrane.

9. The electrolyte membrane for the solid polymer fuel cell according to claim 2,
wherein the mass per unit area in the region corresponding to the gasket frame region and the region corresponding to the at least part of the peripheral portion of the region corresponding to the gasket frame region is greater than and smaller than 15 times as great as the mass per unit area in the region corresponding to the center portion of the power generating region.

10. The electrolyte membrane for the solid polymer fuel cell according to claim 2,
wherein the reinforce membrane has a thickness in the region corresponding to the gasket frame region and the region corresponding to the at least part of the peripheral portion of the region corresponding to the gasket frame region which is greater than and 15 times or less of a thickness in the region corresponding to the center portion of the power generating region.

11. The electrolyte membrane for the solid polymer fuel cell according to claim 2,
wherein the nonwoven fibers have a fiber diameter in the region corresponding to the gasket frame region and the region corresponding to the at least part of the peripheral portion of the region corresponding to the gasket frame region which is greater than and 15 times or less of a fiber diameter in the region corresponding to the center portion of the power generating region.

12. The electrolyte membrane for the solid polymer fuel cell according to claim 2,
wherein the nonwoven fibers are prepared through electrospinning.

13. The electrolyte membrane for the solid polymer fuel cell according to claim 2,
wherein the electrolyte membrane is a proton conductive ion exchange membrane.

14. The electrolyte membrane for the solid polymer fuel cell according to claim 3,
wherein the mass per unit area in the region corresponding to the gasket frame region and the region corresponding to the at least part of the peripheral portion of the region corresponding to the gasket frame region is greater than and smaller than 15 times as great as the mass per unit area in the region corresponding to the center portion of the power generating region.

15. The electrolyte membrane for the solid polymer fuel cell according to claim 3,
wherein the reinforce membrane has a thickness in the region corresponding to the gasket frame region and the region corresponding to the at least part of the peripheral portion of the region corresponding to the gasket frame region which is greater than and 5 times or less of a thickness in the region corresponding to the center portion of the power generating region.

16. The electrolyte membrane for the solid polymer fuel cell according to claim 3,
wherein the nonwoven fibers have a fiber diameter in the region corresponding to the gasket frame region and the region corresponding to the at least part of the peripheral portion of the region corresponding to the gasket frame region which is greater than and 15 times or less of a fiber diameter in the region corresponding to the center portion of the power generating region.

17. The electrolyte membrane for the solid polymer fuel cell according to claim 3,
wherein the nonwoven fibers are prepared through electrospinning.

18. The electrolyte membrane for the solid polymer fuel cell according to claim 3,
wherein the electrolyte membrane is a proton conductive ion exchange membrane.

\* \* \* \* \*